(12) United States Patent
Saeki

(10) Patent No.: US 7,185,934 B2
(45) Date of Patent: Mar. 6, 2007

(54) VEHICLE BODY STRUCTURE

(75) Inventor: Hidetsugu Saeki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 34 days.

(21) Appl. No.: 10/843,668

(22) Filed: May 12, 2004

(65) Prior Publication Data

US 2004/0245033 A1    Dec. 9, 2004

(30) Foreign Application Priority Data

May 12, 2003  (JP)  .............................. 2003-133719

(51) Int. Cl.
*B62D 27/04* (2006.01)
(52) U.S. Cl. .................................... 296/35.2
(58) Field of Classification Search .............. 296/35.2, 296/35.3, 187.03, 187.09, 187.11, 187.12, 296/187.08, 190.03, 190.08, 190.04; 280/784; 180/89.13

See application file for complete search history.

(56) References Cited

U.S. PATENT DOCUMENTS 3,806,184 A * 4/1974 Dean ......................... 296/35.1
5,251,911 A * 10/1993 Blake ......................... 296/35.1
5,915,775 A * 6/1999 Martin et al. ............... 296/35.2
6,464,275 B2   10/2002 Laurent et al.

FOREIGN PATENT DOCUMENTS

JP  9-202268 A   8/1997
JP  2001-278111 A  10/2001

* cited by examiner

*Primary Examiner*—Stephen Gordon
(74) *Attorney, Agent, or Firm*—Global IP Counselors, LLP

(57) ABSTRACT

A vehicle body structure is configured that enables a cabin section and a chassis frame to move relative to each other and enables both strength of the vehicle body and the safety of the occupants during a collision to be ensured with good efficiency. The cabin section serves as the space in which the passengers reside. The chassis frame and cabin section are separate, independent structures connected through a displacement mechanism in such a manner that the chassis frame and cabin section can move separately relative to each other, when a collision occurs. As a result, transmission of the collision impact to the cabin section is alleviated in an effective manner and the strength of the cabin section and chassis frame can be increased.

50 Claims, 23 Drawing Sheets

VEHICLE BODY STRUCTURE

BACKGROUND OF THE INVENTION

1. Field of the Invention

The present invention relates to a vehicle body structure. More particularly, the present invention relates to a vehicle body structure configured to ensure both the strength of the vehicle body and the protection of the passengers.

2. Background Information

One example of a conventional vehicle body structure is disclosed in Japanese Laid-Open Patent Publication No. 9-202268 (page 2 and FIG. 1) that uses extruded light alloy materials for main framework members of the vehicle body to reduce the weight of the vehicle body and improve the protection of the passengers.

In view of the above, it will be apparent to those skilled in the art from this disclosure that there exists a need for an improved vehicle body structure that ensure both the strength of the vehicle body and the protection of the passengers. This invention addresses this need in the art as well as other needs, which will become apparent to those skilled in the art from this disclosure.

SUMMARY OF THE INVENTION

The conventional vehicle body structure disclosed in the above mentioned reference is able to realize a high strength and a lightweight body structure using extruded light alloy materials for the main framework members. However, in recent years, there have been some problems regarding compatibility issues, which demands higher impact energy absorption capacities. Particularly with the increasing number of older citizens who are physically less durable from a bioengineering perspective, there is a demand for vehicles to provide even better protection to the passengers.

Therefore, one object of the present invention is to provide a vehicle body structure that enables a cabin section and a chassis frame to move relative to each other so as to effectively ensure both strength of the vehicle body and protection of the occupants during a collision.

In order to achieve the above identified and other objects, a vehicle body structure basically comprises a chassis frame, a cabin section and a displacement mechanism. The cabin section is configured and arranged as a separate and independent structure from the chassis frame and to form a passenger residing space. The displacement mechanism connects the cabin section to the chassis frame such that the cabin section can move separately relative to the chassis frame in response to an impact load.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
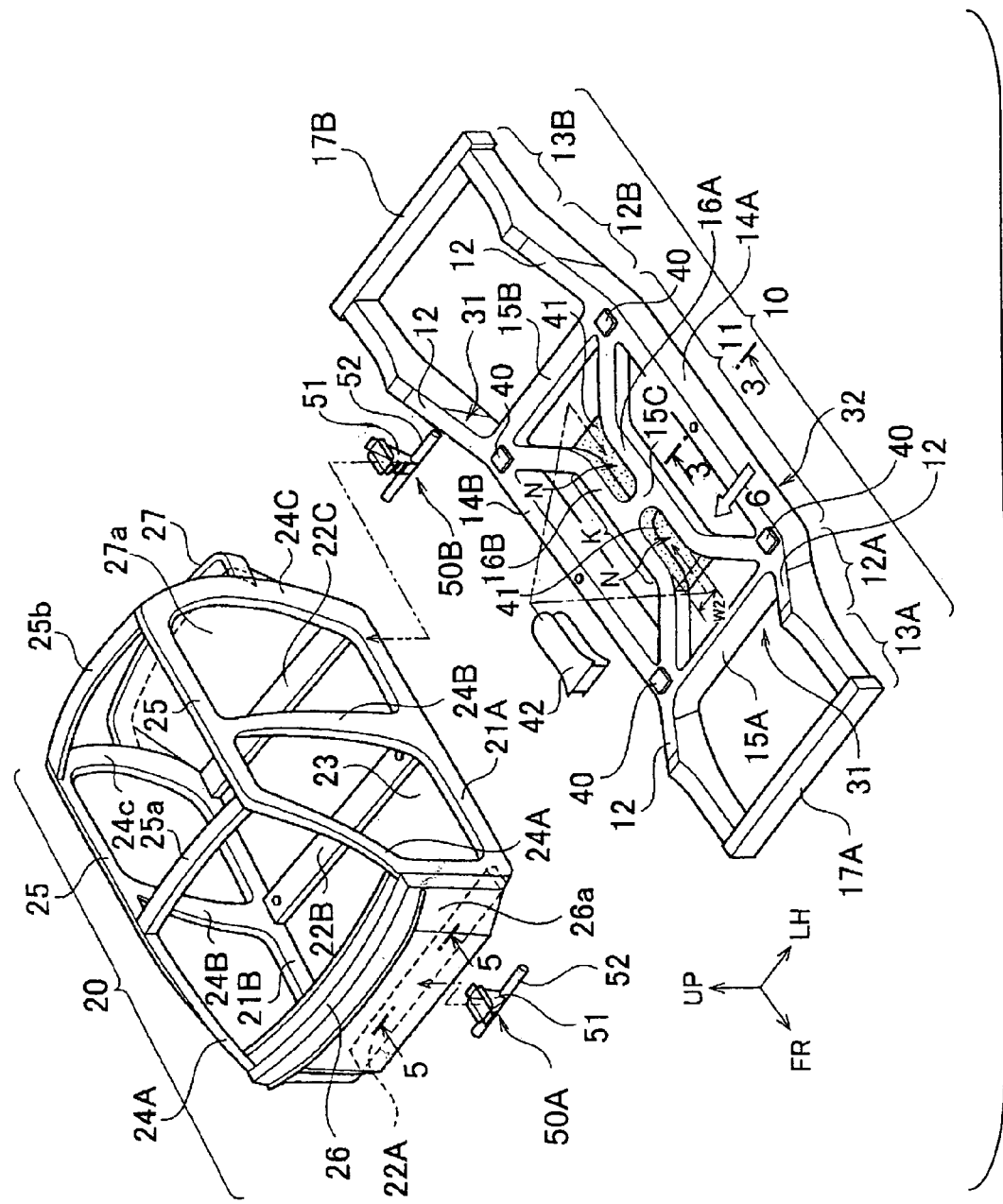
FIG. 1 is a simplified exploded front perspective view of an overall vehicle body structure in accordance with a first embodiment of the present invention.

Referring initially to FIGS. 1 to 11, a vehicle body structure is illustrated in accordance with a first embodiment of the present invention. FIG. 1 is a simplified exploded front perspective view of an overall vehicle body structure. As shown in FIG. 1, the vehicle body structure according to the first embodiment basically comprises a chassis frame 10 and a cabin section 20. The chassis frame 10 is a frame structure on which a plurality of wheels and a power train unit are mounted. The cabin section 20 is configured and arranged to serve as a space in which the passengers reside. The chassis frame 10 and cabin section 20 are arranged as separate, independent structures that are coupled together by a displacement mechanism in such a manner that the chassis frame 10 and the cabin section 20 can move relative to each other in response to an impact load during a collision. Thus, with the vehicle body structure of the first embodiment of the present invention, when a collision load is imparted to the chassis frame 10 during the collision, the cabin section 20 moves relative to the chassis frame 10 due to the displacement mechanism. As a result, transmission of the collision impact to the cabin section 20 is alleviated in an effective manner. Also, since the cabin section 20 and the chassis frame 10 can move relative to each other, the strengths of the cabin section 20 and the chassis frame 10 can be increased.

The displacement mechanism of the first embodiment comprises several components, as discussed in more detail below. One of the components of the displacement mechanism is a cabin longitudinal movement mechanism configured and arranged to allow the cabin section 20 to move upward with respect to the chassis frame 10 on a collision side and restrain upward movement of the cabin section 20 on the non-collision side when the vehicle undergoes a front collision or a rear collision. Thus, the cabin longitudinal movement mechanism preferably comprises components that are configured and arranged to allow a relative displacement between the chassis frame 10 and the cabin section 20 during a front or rear collision, such as a pair of front and rear kick-up sections 12A and 12B of the chassis frame 10, a pair of shear bolts 33, a pair of mating members 50A and 50B and the like as discussed in more detail below.

Another component of the displacement mechanism is a cabin section transverse movement mechanism configured and arranged to allow the cabin section 20 to move toward a non-collision side with respect to the chassis frame 10 when the vehicle undergoes a side collision in which the input load is concentrated on the cabin section 20. Thus, the cabin section transverse movement mechanism preferably comprises components that are configured and arranged to allow a relative displacement between the chassis frame 10 and the cabin section 20 during a side collision, such as the shear bolts 33, attitude stabilizing mechanisms 40 and the like as discussed in more detail below.

As seen in FIG. 1, the chassis frame 10 comprises a plurality of framework members including a floor section 11, the front and rear kick-up sections 12A and 12B, a front end section 13A, and a rear end section 13B. The floor section 11 is configured and arranged to be positioned under the cabin section 20. The front and rear kick-up sections 12A and 12B are configured to form slanted surfaces 12 on the front and rear of the floor section 11. The front end section 13A is provided in front of the front kick-up section 12A. The rear end section 13B is provided in rear of the rear kick-up section 12B.

Figure 2:
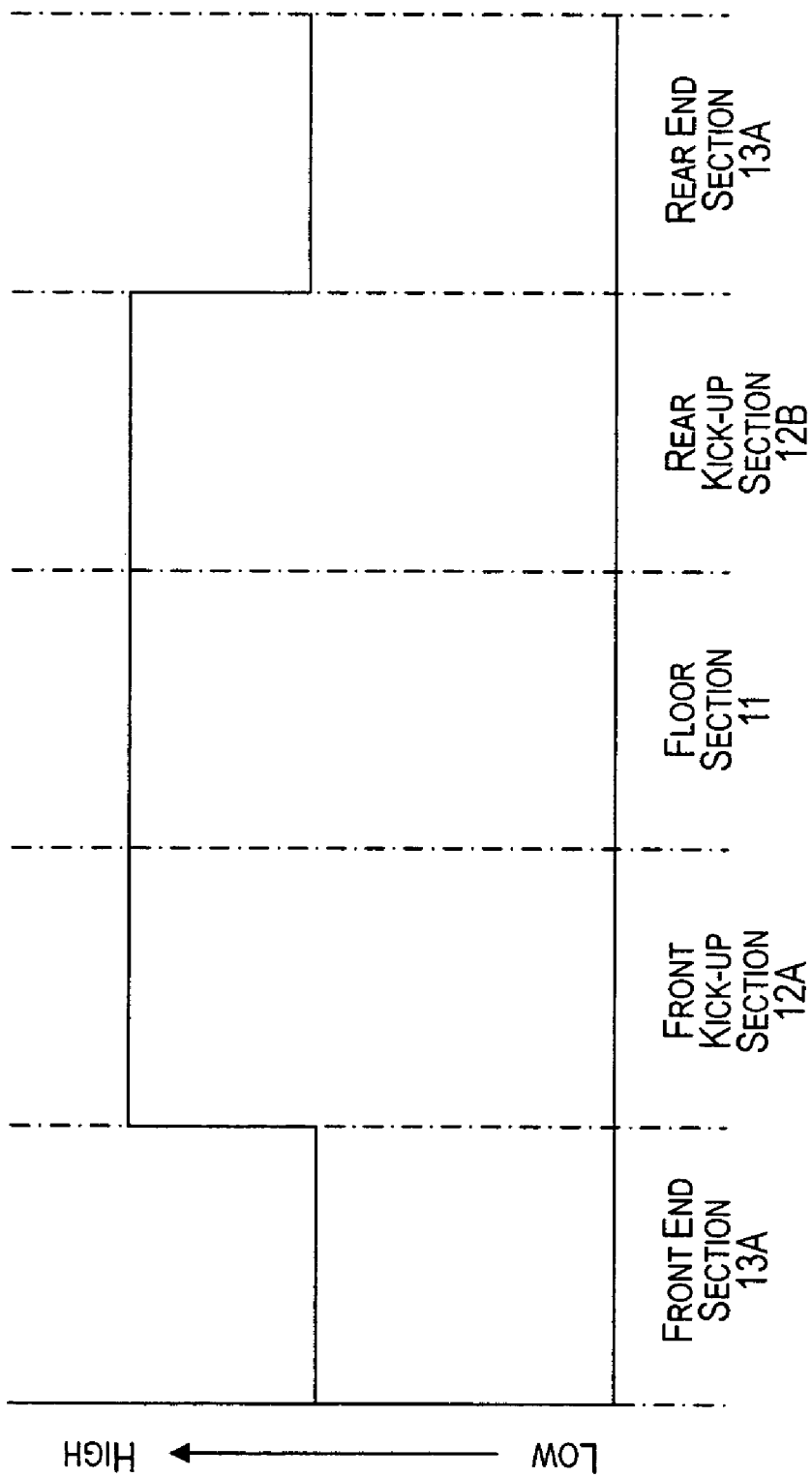
FIG. 2 is a diagrammatic plot showing a strength distribution with respect to a longitudinal (front or rear) collision for different sections of a chassis frame of the vehicle body structure in accordance with the first embodiment of the present invention.

FIG. 2 is a diagrammatic plot showing a strength distribution with respect to a longitudinal (front or rear) collision input for different sections of the chassis frame 10 according to the first embodiment. As seen in FIG. 2, the rigidity and strength of the chassis frame 10 with respect to an input force from the front of the vehicle and the rear of the vehicle is preferably distributed. More specifically, the rigidity and strength of the front end section 13A and the rear end section 13B are preferably set to approximately equal to each other. The rigidity and strength of the front and rear kick-up sections 12A and 12B and the floor section 11 are preferably set to approximately equal to each other. Moreover, the rigidity and strength of the front and rear kick-up sections 12A and 12B and the floor section 11 are greater than the rigidity and strength of the front end section 13A and the rear end section 13B, as seen in FIG. 2.

In other words, the balance of rigidity and strength of the framework members of the chassis frame can be expressed mathematically as follows: the front end section 13A≈rear end section 13B<the front kick-up section 12A≈the rear kick-up section 12B≈floor section 11.

Moreover, the floor section 11 of the chassis frame 10 is provided with a pair of left and right side frames 14A and 14B, a pair of front and rear cross frames 15A and 15B, and a pair of left and right center frames 16A and 16B. As seen in FIG. 1, the left and right side frames 14A and 14B are located on the left and right sides of the floor section 11 and extend in the longitudinal direction of the vehicle between the front and rear kick-up sections 12A and 12B. The front and rear cross frames 15A and 15B are provided at border portions between the front and rear kick-up sections 12A and 12B and the floor section 11, and extend between the left and side frames 14A and 14B to couple the left and right side frames 14A and 14B. The left center frame 16A is connected to portions where the front and rear cross frames 15A and 151B are coupled to the left side frame 14A and extend in the longitudinal direction. Similarly, the right center frame 16B is connected to portions where the front and rear cross frames 15A and 15B are coupled to the right side frame 14B and extend in the longitudinal direction. The left and right center frames 16A and 16B are arranged to draw closer to each other in the widthwise direction of the vehicle at longitudinal center portions of the left and right center frames 16A and 16B to form a drawn-close portion N of the floor section 11. Thus, a space formed between the longitudinal center portions of the left and right center frames 16A and 16B has a larger transverse width than a space formed between longitudinal edge portions of the left and right center frames 16A and 16B. A center cross frame 15C is provided that couples the left and right center frames 16A and 16B together at substantially longitudinal midpoints of the longitudinal center portions of the left and right center frames 16A and 16B where the left and right center frames 16A and 16B are arranged to draw closer to each other.

More specifically, in a top plan view, the left and right center frames 16A and 16B are shaped like trapezoids along with the left and right side frames 14A and 14B. In other words, the left and right center frames 16A and 16B are provided with prescribed interval sections K that run substantially parallel to the longitudinal direction of the vehicle in the drawn-close portion N (i.e., the frame portion where the left and right center frames 16A and 16B are coupled together by the center cross frame 15C). The prescribed interval sections K of the drawn-close portion N also constitute part of the displacement mechanism of the first embodiment.

The chassis frame 10 also includes a front cross member 17A connected to the front ends of the front end section 13A and a rear cross member 17B connected to the rear ends of the rear end section 13B.

Still referring to FIG. 1, the cabin section 20 preferably has a flat underside formed with a lower framework. The lower framework of the cabin section 20 basically comprises a pair of left and right side-edge framework members 21A and 211B, a front framework member 22A, a middle framework member 22B and a rear framework member 22C, as seen in FIG. 1. The left and right side-edge framework members 21A and 21B are configured to extend in the longitudinal direction of the vehicle to form the left and right sides of the lower framework of the cabin section 20. The front, middle, and rear transverse framework members 22A, 22B and 22C are configured to transversely connect the left and right side-edge framework members 21A and 21B together at the front end, middle section, and rear end of the left and right side-edge framework members 21A and 21B. A floor panel 23 is provided horizontally arranged and coupled to the front, middle and rear transverse framework members 22A, 22B and 22C. The floor panel 23 can be attached to the top or bottom surfaces of the framework members 22A, 22B and 22C as needed and/or desired.

Moreover, the cabin section 20 comprises a pair of front pillars 24A, a pair of center pillars 24B and a pair of rear pillars 24C. The front pillars 24A are configured and arranged to extend upwardly from front end portions of the left and right side-edge framework members 21A and 21B. The center pillars 24B are configured and arranged to extend upwardly from longitudinally middle portions of the left and right side-edge framework members 21A and 21B. The rear pillars 24C are configured and arranged to extend upwardly from rear end portions of the left and right side-edge framework members 21A and 21B. Upper end portions of each of the front, center and rear pillars 24A, 24B and 24C are coupled together by a pair of roof side rails 25. Moreover, a dash cross member 26 is provided to connect substantially intermediate portions of the left and right front pillars 24A. A dash panel 26a is also provided to cover an area between the dash cross member 26 and the front transverse framework member 22A.

The cabin section 20 further comprises a roof cross member 25a configured and arranged to connect between front end portions of the roof side rails 25 and a roof cross member 25b configured and arranged to connect between rear end portions of the roof side rails 25. A rear cross member 27 is also provided to connect between substantially intermediate portions of the rear pillars 24C. An end panel 27a is provided to cover an area between the rear cross member 27 and the rear transverse framework member 22C. The cabin section 20 can also include other panels (not shown) such as a roof panel as needed and/or desired for the particular cabin structure that utilizes the present invention.

The cabin section 20 and the chassis frame 10 are fastened or joined together with a plurality of shear bolts 33 that are configured and arranged to break due to shear when subjected to a load input equal to or greater than a prescribed load. In the present invention, the shear bolts 33 constitute part of the displacement mechanism. In the first embodiment of the present invention, the chassis frame 10 is preferably fastened by the shear bolts 33 to the cabin section 20 at locations on the left and right side frames 14A and 14B. In particular, the cabin section 20 is preferably fastened by the shear bolts 33 at locations on the middle transverse framework member 22B near the portions where the left and right side-edge framework members 21A and 21B are coupled to the middle transverse framework member 22B. As explained above, the center pillar 24B extends upwardly from the portions where the left and right side-edge framework members 21A and 21B are coupled to the middle transverse framework member 22B. Consequently, particularly in a side collision in which the collision load is concentrated on the cabin section 20, an input force to a lateral side of the cabin section 20 is received by the center pillar 24B and transmitted efficiently to at least one of the left and right side-edge framework members 21A or 21B and the middle transverse framework member 22B. As a result, shear forces is configured to act on the shear bolts 33 in a reliable manner.

Figure 3:
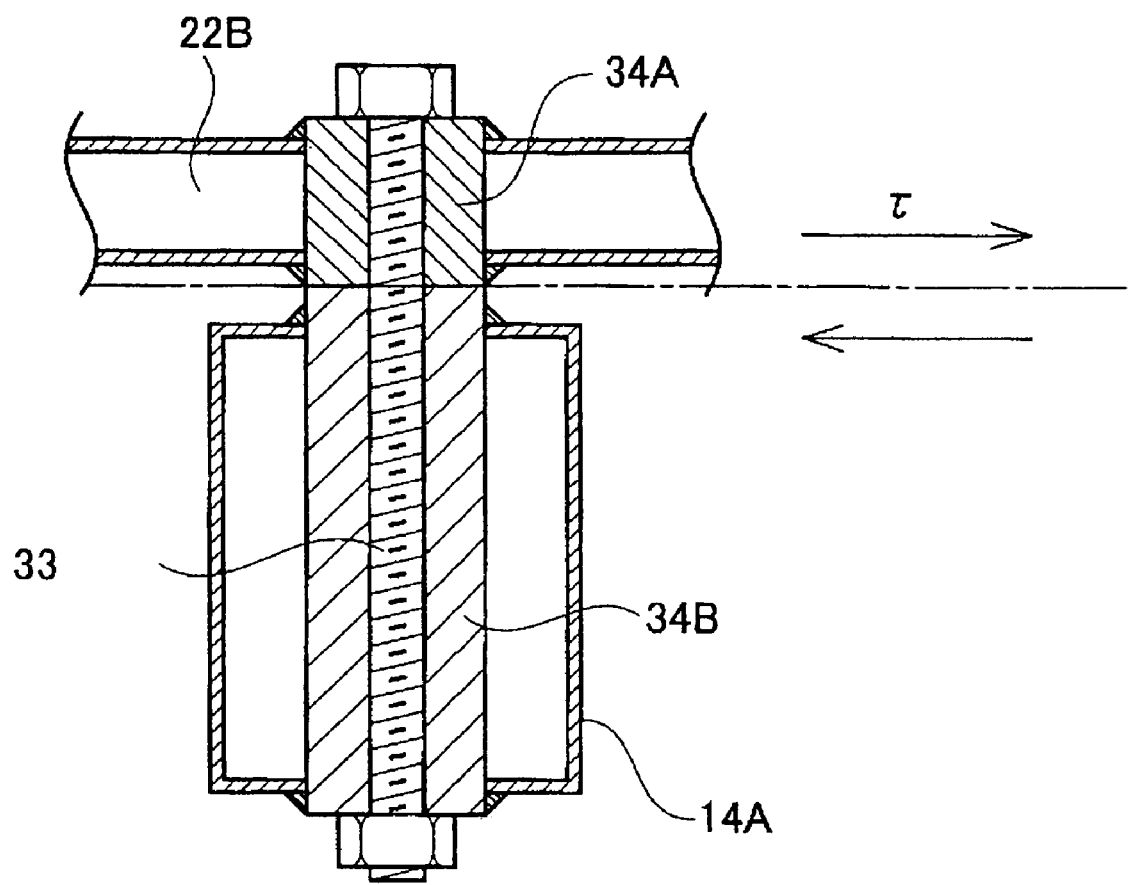
FIG. 3 is an enlarged partial cross sectional view taken along section line 3—3 of FIG. 1 when a cabin section and the chassis frame of the vehicle body structure are assembled together with a plurality of shear bolts that forms part of a displacement mechanism in accordance with the first embodiment of the present invention.

FIG. 3 is an enlarged partial cross sectional view taken along section line 3—3 of FIG. 1 when the cabin section 20 and the chassis frame 10 are assembled with the shear bolts 33. As seen in FIG. 3, the shear bolt 33 is configured and arranged to pass through upper and lower cylindrical members 34A and 34B in a substantially close-fitting manner. The upper and lower cylindrical members 34A and 34B are preferably fixed to the middle transverse framework member 22B of the cabin section 20 and the left side frame 14A of the chassis frame 10, respectively, and arranged in a substantially coaxial manner. The middle transverse framework member 22B of the cabin section 20 and the right side frame 14B of the chassis frame 10 are also coupled together by using the shear bolt 33 and the upper and lower cylindrical members 34A and 34B in a same manner as shown in FIG. 3.

Since the upper and lower cylindrical members 34A and 34B are arranged in a substantially coaxial manner, a large shear force acts on the shear bolts 33 between the upper and lower cylindrical members 34A and 34B when a collision load is imparted to the chassis frame 10 during a front or rear collision or when the vehicle undergoes a side collision in which the input load is concentrated on the cabin section 20. Thus, the shear bolts 33 are configured and arranged to break due to shear to enable a relative displacement of the chassis frame 10 and the cabin section 20.

The attitude stabilizing mechanisms 40 are preferably disposed between the chassis frame 10 and the cabin section 20 in four locations. More specifically, the attitude stabilizing mechanisms 40 are positioned at front and rear end portions of the left and right side frames 14A and 14B, as seen in FIG. 1. The attitude stabilizing mechanisms 40 are preferably made of a substance having a lower elastic modulus (e.g., synthetic resin) than materials from which the chassis frame 10 and the cabin section 20 are made. The attitude stabilizing mechanisms 40 are preferably coupled to the chassis frame 10 with an adhesive. The attitude stabilizing mechanisms 40 act as energy absorbing members that slow the movement of the cabin section 20 relative to the chassis frame 10.

The mating members 50A and 50B are provided so as to extend vertically downwardly from the lower framework of the cabin section 20. More specifically, in the first embodiment of the present invention, the mating members 50A and 50B are configured and arranged to extend vertically downwardly from transversely middle (center) portions of the front transverse framework member 22A and the rear transverse framework member 22C. The mating members 50A and 50B are configured and arranged to sliceable mate with bottom surfaces of the drawn-close portion N of the left and right center frames 16A and 16B when the cabin section 20 moves in the longitudinal direction of the vehicle. The mating members 50A and 50B constitute part of the displacement mechanism.

Figure 4:
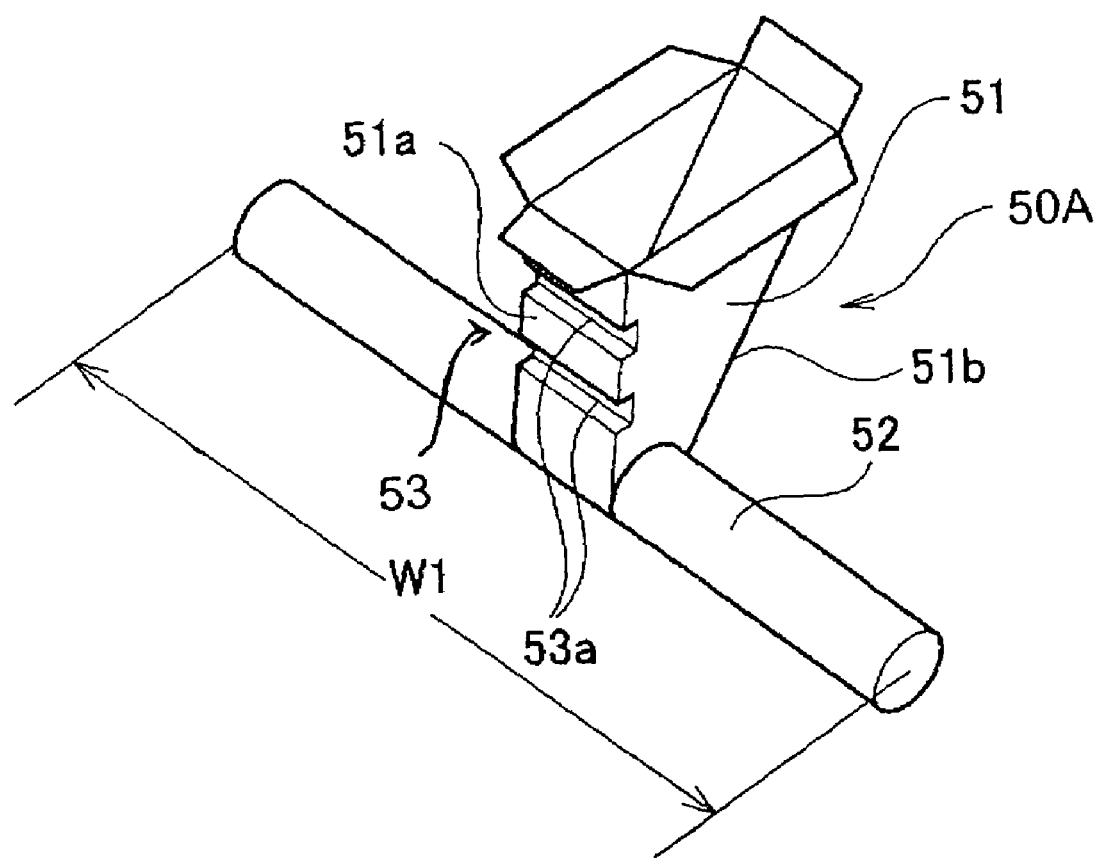
FIG. 4 is an enlarged perspective view of a mating member of the displacement mechanism of the vehicle body structure in accordance with the first embodiment of the present invention.
Figure 5:
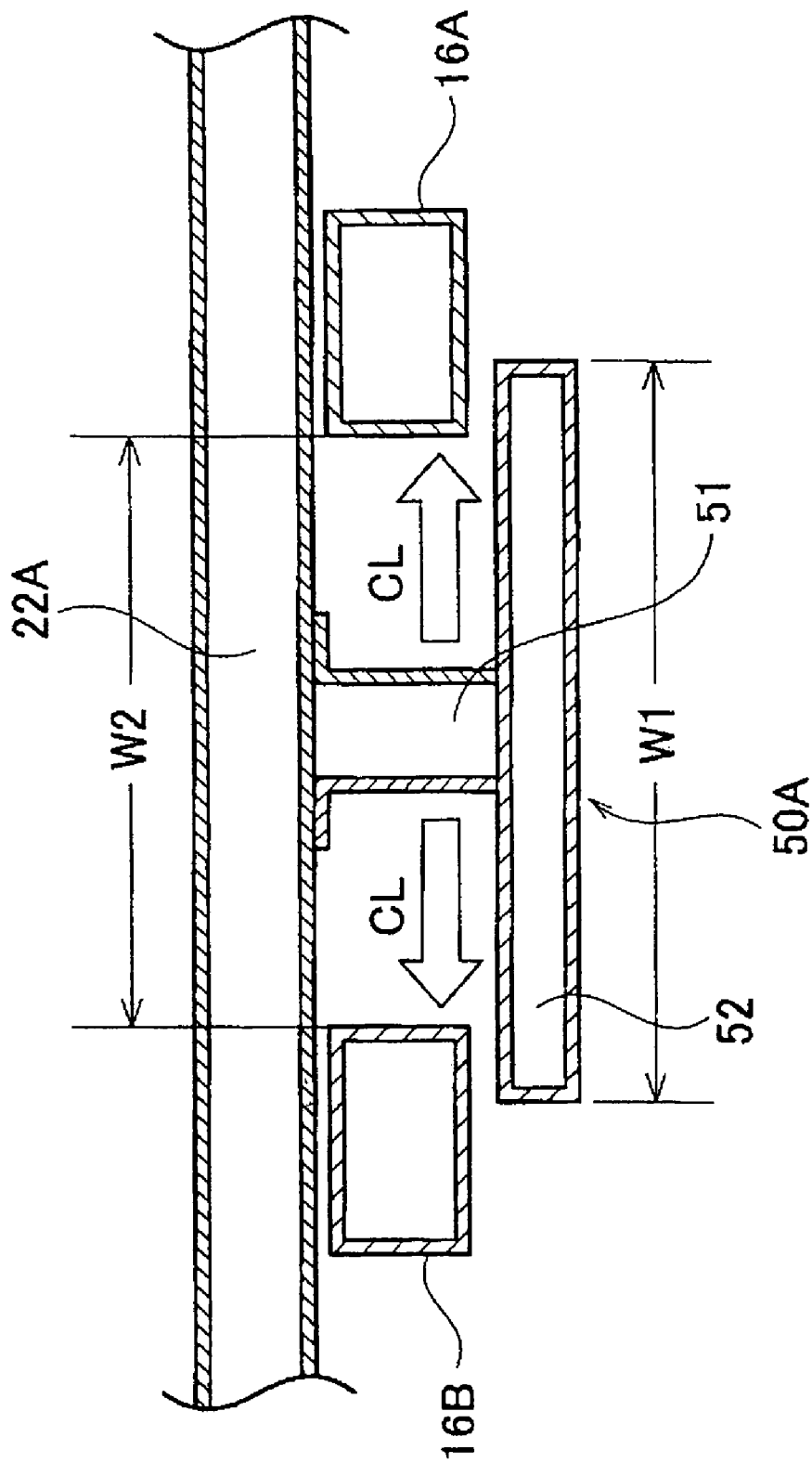
FIG. 5 is an enlarged cross sectional view of the mating member, the cabin section and the chassis frame of the vehicle body structure taken along section line 5—5 of FIG. 1 when the mating member, the cabin section and the chassis frame are assembled together in accordance with the first embodiment of the present invention.
Figure 6:
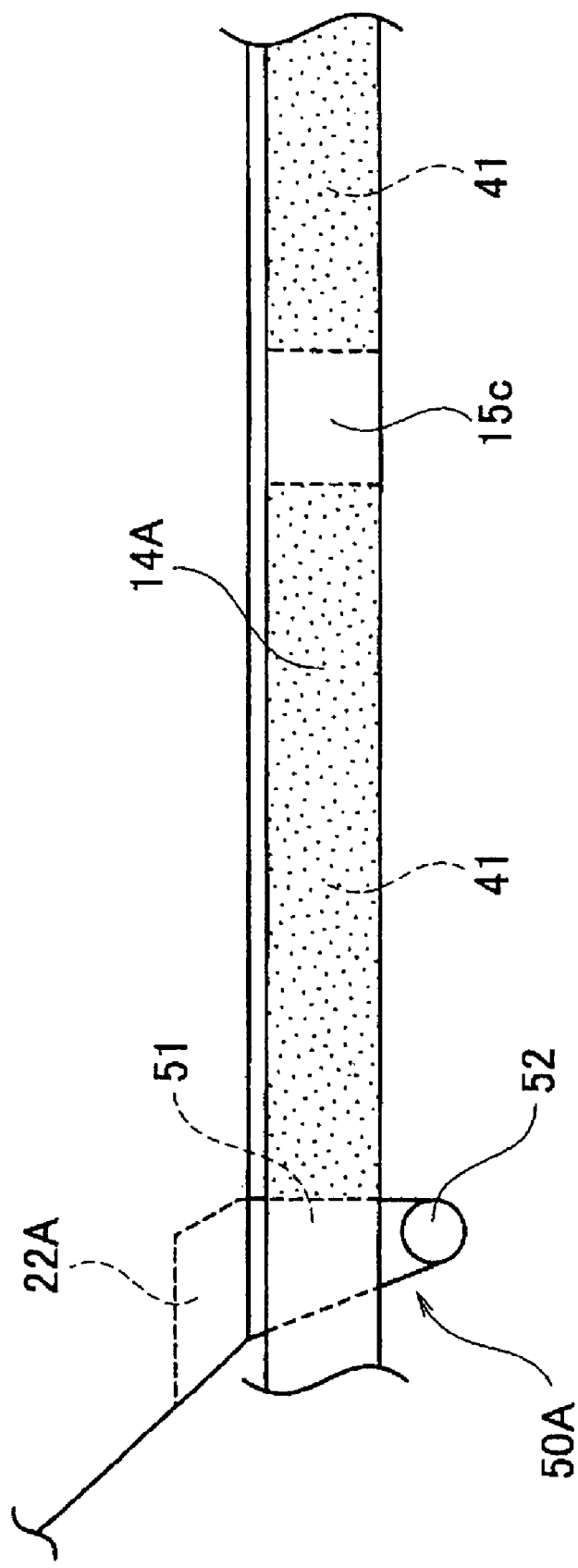
FIG. 6 is an enlarged partial side elevational view of the chassis frame, the cabin section, the mating member and a readily deformable member viewed in a direction indicated by an arrow 6 in FIG. 1 when the chassis frame, the cabin section, the mating member and the readily deformable member are assembled together in accordance with the first embodiment of the present invention.

Referring now to FIGS. 4 to 6, the mating members 50A and 50B will be further described using the mating member 50A as an example. FIG. 4 is an enlarged perspective view of the mating member 50A. As seen in FIG. 4, the mating member 50A has a substantially T-shaped structure. The mating member 50A basically comprises a holding arm 51 and a horizontal part or hollow bar 52. The holding arm 51 is configured and arranged to be mounted to the front transverse framework member 22A of the cabin section 20. The horizontal part 52 is connected to a bottom end of the holding arm 51. The horizontal part 52 is oriented to extend in the transverse direction of the vehicle. Preferably, the horizontal part 52 is perpendicular to the center longitudinal axis of the vehicle. FIG. 5 is an enlarged cross sectional view of the mating member 50A, the cabin section 10 and the chassis frame 20 of the vehicle body structure taken along section line 5—5 of FIG. 1 when the mating member 50A, the cabin section 10 and the chassis frame 20 are assembled.

As seen in FIG. 5, the mating member 50A has a larger transverse width W1 in the transverse direction of the vehicle than a transverse width W2 (also shown in FIG. 1) of a space formed in the drawn-close portion N between the left and right center frames 16A and 16B. The horizontal part 52 is configured and arranged to be positioned below the left and right center frames 16A and 16B when the chassis frame 10, the cabin section 20 and the mating member 50A are assembled together as seen in FIG. 6.

As shown in FIG. 4, the holding arm 51 is formed to have a substantially vertical wall 51a on a side that faces the center cross frame 15C of the chassis frame 10. Moreover, the holding arm 51 includes a slanted part 51b on an opposite side of the vertical wall 51a. The slanted part 51b is configured and arranged to slant upwardly and away from the vertical wall 51a.

The vertical wall 51a of the holding arm 51 is provided with a structurally weakened part 53 for promoting a controlled collapse or deformation of the holding arm 51 when the holding arm 51 contacts with the front cross frame 15A of the floor section 11 of the chassis frame 10 when the cabin section 20 moves forward relative to the chassis frame 10 during a front collision. Thus, as seen in FIG. 6, the mating member 50A is configured and arranged to be mounted to the front transverse framework member 22A such that the vertical wall 51a of the holding arm 51 faces the center cross frame 15C. In the first embodiment, the structurally weakened part 53 comprises two upper and lower recessed grooves 53a that are formed transversely across the vertical wall 51a as seen in FIG. 4. The structure of the mating member 50B is substantially the same as the structure of the mating member 50A. The mating member 50B is preferably mounted to the rear transverse framework member 22C in the same manner as the mating member 50A is mounted to the front transverse framework member 22A. In other words, the mating member is mounted to the rear transverse framework member 22C such that the vertical wall 51a with the structurally weakened part 53 of the mating member 50B faces the center cross frame 15C. Thus, when the holding arm 51 of the mating member 50B contacts with the rear cross frame 15B of the floor section 11 of the chassis frame 10 when the cabin section 20 moves rearward relative to the chassis frame 10 during a rear collision, the holding arm 51 of the mating member 50B starts deforming or collapsing at the structurally weakened part 53.

As seen in FIG. 1, two readily deformable members 41 are arranged at the drawn-close portion N of the longitudinal center portions of the left and right center frames 16A and 16B at positions closer to the center cross frame 15C than the mating members 50A and 50B, respectively. The readily deformable members 41 preferably have smaller deformation strength than the floor section 11 of the chassis frame 10, the lower framework of the cabin section 20 and the mating members 50A and 50B. In the first embodiment, the readily deformable members 41 are preferably made of foamed metal. Moreover, in the first embodiment, outside surfaces of the readily deformable members 41 are preferably covered with deformable covers 42 as shown in FIG. 1.

Figure 7:
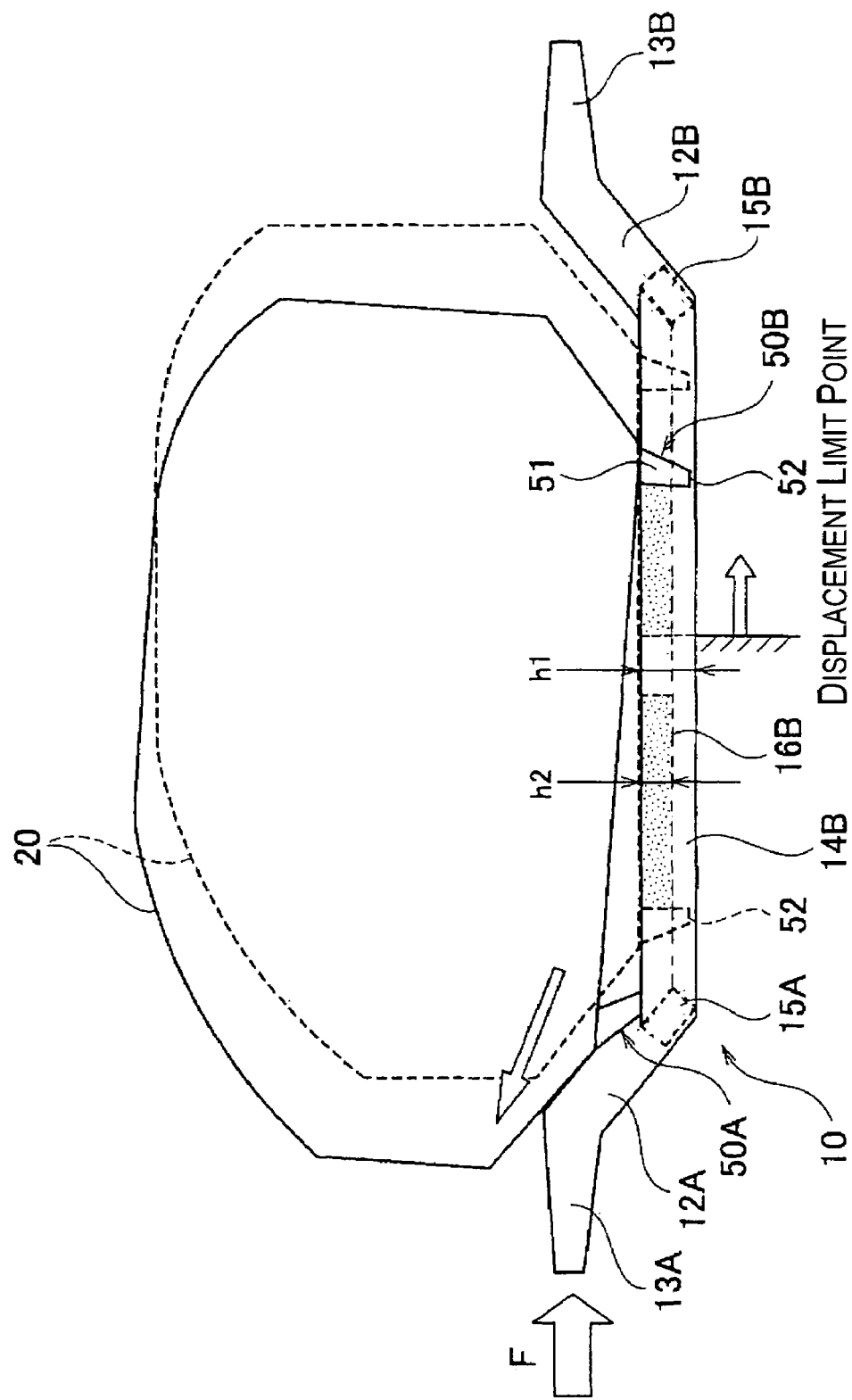
FIG. 7 is a simplified diagrammatic side elevational view of the vehicle body structure illustrating a behavior of the displacement mechanism during a front collision in accordance with the first embodiment of the present invention.

As shown in FIG. 7, a cross sectional height h1 of the left and right side frames 14A and 14B is preferably set to be larger than a cross sectional height h2 of the left and right center frames 16A and 16B. Moreover, a top surface height position of the left and right side frames 14A and 14B is preferably set to be approximately equal to a top surface height position of the left and right center frames 16A and 16B so that the top surfaces of the left and right side frames 14A and 14B and the left and right center frames 16A and 16B are substantially level. Furthermore, the position of the bottom end of the mating members 50A and 50B, i.e., the position of the bottom end of the horizontal parts 52 of the mating members 50A and 50B, is preferably set to be higher than the bottom surface of the left and right side frames 14A and 14B.

In the first embodiment, the chassis frame 10 and the cabin section 20 are preferably constituted by frame members and framework members that are hollow members having a rectangular or polygonal cross sectional shape.

Accordingly, in the vehicle body structure of the first embodiment, the chassis frame 10 and cabin section 20 are configured and arranged to be separate and independent structures and the cabin section 20 is coupled to the chassis frame 10 through the displacement mechanism such that the cabin section 20 can move relative to the chassis frame 10 during a collision. Consequently, when an impact load is imparted to the chassis frame 10 in a collision, the cabin section 20 moves relative to the chassis frame 10 using the displacement mechanism. As a result, transmission of the impact load caused by the collision to the cabin section 20 can be effectively alleviated. Furthermore, since the cabin section 20 and chassis frame 10 can move relative to each other, the cabin section 20 and chassis frame 10 can be made with higher strength levels. As a result, both the strength of the vehicle body and the protection of the occupants during a collision are effectively ensured.

In addition, since the displacement mechanism includes the cabin longitudinal movement mechanisms configured to allow the cabin section 20 to move upwardly with respect to the chassis frame 10 on the collision side and restrain upward movement of the cabin section 20 on the non-collision side when the vehicle undergoes a front collision or a rear collision, when a front or rear collision occurs, the vehicle body structure according to the first embodiment behaves as shown in FIG. 7. FIG. 7 illustrates the behavior of the cabin section 20 with respect to the chassis frame 10 during a front collision. When the front collision occurs, an impact load F is imparted to the front cross member 17A which causes the shear bolts 33 to break so that the cabin section 20 and the frame section 10 can move relative to each other. During the front collision, the cabin section 20 moves relative to the chassis frame 10 from the position indicated with a broken line in FIG. 7 to the position indicated with a solid line. In other words, a portion of the cabin section 20 facing toward the colliding object or a direction of the collision (i.e., front) reliably moves or escapes upwardly in the collision direction. As a result, the vehicle structure is configured and arranged to avoid a direct input of the impact load F to the cabin section 20. Therefore, impact of the collision on the vehicle occupants can be reduced.

Figure 8:
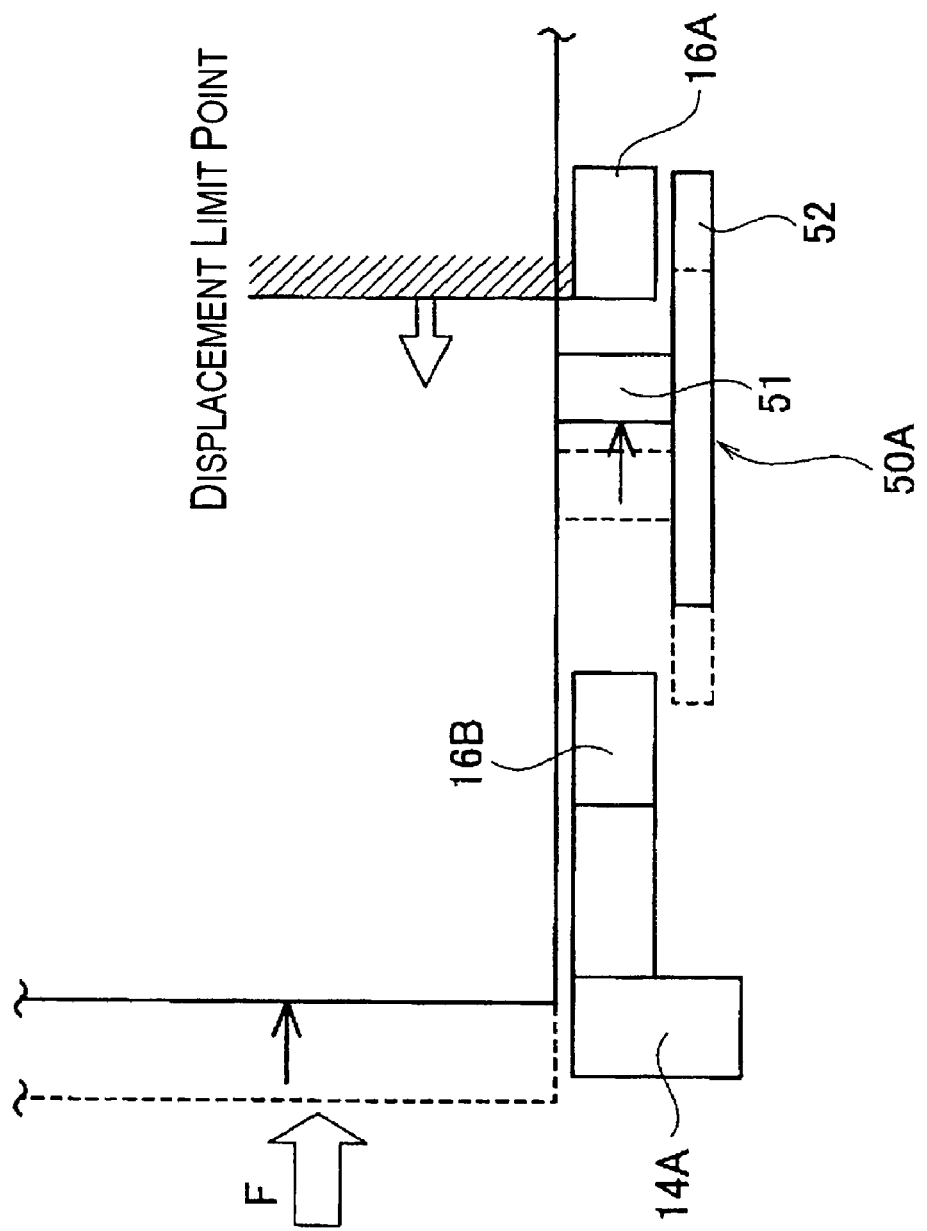
FIG. 8 is a simplified diagrammatic partial front elevational view of the vehicle body structure illustrating a behavior of the displacement mechanism during a side collision in accordance with the first embodiment of the present invention.

The displacement mechanism also preferably includes the cabin section transverse movement mechanism configured and arranged to allow the cabin section 20 to move toward the non-collision side with respect to the chassis frame 10 when the vehicle undergoes a side collision in which the input load is concentrated on the cabin section 20. FIG. 8 is a simplified partial front elevational view of the vehicle body structure illustrating a behavior of the cabin section 20 by the cabin section transverse movement mechanism during a side collision. Since the cabin section 20 is usually the only part that moves during a side collision in which the input load is concentrated on the cabin section 20, the inertial mass of the cabin section 20 can be reduced by moving the cabin section 20 with respect to the chassis frame 10 toward the non-collision side, as seen in FIG. 8. Thus, the degree of penetration caused by deformation at the place of impact against the cabin section 20 can be suppressed more effectively and efficiently.

As explained above, the chassis frame 10 includes the floor section 11, the front and rear kick-up sections 12A and 12B, the front end section 13A, and the rear end section 13B and the balance of rigidity with respect to input from the front and rear of the vehicle are set such that the front end section 13A≈rear end section 13B<the front kick-up section 12A≈the rear kick-up section 12B≈the floor section 11. Therefore, the colliding object can be borne by the front end section 13A and the front kick-up section 12A during a front collision or the rear end section 13B and the rear kick-up section 12B during a rear collision. As a result, the deformation of the chassis frame 10 limited to the front end section 13A and the rear kick-up section 12B.

Since the floor section 11 is provided with the left and right side frames 14A and 14B, the front and rear cross frames 15A and 15B, the left and right center frames 16A and 16B, and a center cross frame 15C, a collision load acting on the front end section 13A or the rear end section 13B are transmitted from the front rear kick-up section 12A or the rear kick-up section 12B to the left and right side frames 14A and 14B, the left and right center frames 16A and 16B, and the front cross frame 15A or the rear cross frame 15B. As a result, the collision load can be supported by the entire chassis frame 10 and the balance of rigidity and strength between each portions of the chassis frame 10 with respect to input to the front and rear of the chassis frame 10 can be set easily.

Moreover, the cabin section 20 has the flat underside formed by the lower framework including the left and right side-edge framework members 21A and 21B, the front, middle, and rear transverse framework members 22A, 22B and 22C, and the floor panel 23. As a result, a bottom portion of the cabin section 20 has sufficient strength against forces imparted to the bottom portion both during normal use and during collisions.

In this embodiment, the chassis frame 10 has a longitudinal frame rigidity that is equal to or larger than a longitudinal cabin rigidity of the cabin section 20. The chassis frame 10 also has a lateral or transverse frame rigidity that is equal to or smaller than a lateral cabin rigidity of the cabin section 20.

As explained above, the displacement mechanism includes the shear bolts 33 that fasten or couple the cabin section 20 and the chassis frame 10 together. The shear bolts 33 are configured and arranged to break due to shear when subjected to a load input equal to or greater than a prescribed load. Consequently, when a collision load is imparted to the chassis frame 10 during a front collision or a rear collision, the shear bolts 33 is configured and arranged to break due to shear caused by the inertial force acting on the cabin section 20. Therefore, the transmission of the impact force from the chassis frame 10 to the cabin section 20 can be alleviated.

As explained above, the shear bolts 33 are configured and arranged to pass through the upper and lower cylindrical members 34A and 34B in a substantially close-fitting manner. The upper and lower cylindrical members 34A and 34B are fixed to the cabin section 20 and the chassis frame 10, respectively, and arranged in a substantially coaxial manner. When a collision load is imparted to the chassis frame 10 during a front collision or a rear collision or when the vehicle undergoes a side collision in which the input load is concentrated primary on the cabin section 20, a large shear force acts on the shear bolts 33 between the upper and lower cylindrical members 34A and 34B because the upper and lower cylindrical members 34A and 34B are arranged in a substantially coaxial manner. Thus, by breaking the shear bolts 33 to allow the cabin section 20 move with respect to the chassis frame 10, the collision energy can be absorbed efficiently.

In the first embodiment of the present invention, the locations where the cabin section 20 is fastened by the shear bolts 33 are arranged on the middle transverse framework member 22B near the portions where the left and right side-edge framework members 21A and 21B are coupled to the middle transverse framework member 22B. The center pillars 24B are arranged to extend upwardly from the portions where the left and right side-edge framework members 21A and 21B are coupled to the middle transverse framework member 22B. Consequently, particularly in a side collision in which the collision load is concentrated on the cabin section 20, input to a lateral side of the cabin section 20 is borne by the center pillar 24B and transmitted efficiently to the left and right side-edge framework members 21A or 21B and the middle transverse framework member 22B. As a result, the vehicle body structure of the first embodiment is configured and arranged such that the shear force acts on the shear bolts 33 in a reliable manner.

The displacement mechanism further includes the mating members 50A and 50B that extend vertically downwardly from the lower framework of the cabin section 20. More specifically, in the first embodiment, the mating member 50A is arranged to extend downwardly from the front transverse framework member 22A and the mating member 50B is arranged to extend downwardly from the rear transverse framework member 22C. The mating members 50A and 50B are configured and arranged to sliceable mate with the bottom surface of the drawn-close portion N of the left and right center frames 16A and 16B when the mating member 50A or 50B moves longitudinally toward the center cross frame 15C. Consequently, as shown in FIG. 7, when the collision load F is imparted to the chassis frame 10 during a front or rear collision and the chassis frame 10 moves relative to the cabin section 20, the mating member 50A and 50B on the non-collision side sliceable mates with the drawn-close portion N to prevent the non-collision side of the cabin section 20 from lifting up.

On the other hand, the mating members 50A and 50B are configured and arranged such that the mating member 50A or 50B on the collision side of the cabin section 20 does not mate with the drawn-close portion N of the chassis frame 10. Therefore, the collision side of the cabin section 20 is configured and arranged to move upwardly along the front or rear kick-up section 12A or 12B on the collision side.

Moreover, when the movement of the cabin section 20 with respect to the chassis frame 10 is relatively large, the mating member 50A or 50B on the non-collision side is configured and arranged to latch with the center cross frame 15C. Thus, the movement of the cabin 20 can be ultimately restrained.

In the case of a side collision in which the collision load acts on a lower portion of the vehicle, the collision load is initially borne by the side frame 14A or 14B and then transmitted or dispersed to the front and rear cross frames 15A and 15B and the left and right center frames 16A and 16B so that the collision load is borne by the entire chassis frame 10.

On the other hand, when the side collision load is imparted to a relatively high position on the vehicle, i.e., when the collision load is concentrated on the side of the cabin section 20, the shear bolts 33 are configured and arranged to break due to shear failure and the cabin section 20 moves toward the non-collision side with respect to the chassis frame 10, as shown in FIG. 8.

The amount of movement is restricted by the transverse clearance CL as shown in FIG. 5 between the mating members 50A and 50B and the drawn-close portion N of the left and right center frames 16A and 16B. Thus, in a side collision, the cabin section 20 and the chassis frame 10 become an integral unit when the mating members 50A and 50B move to the points where they contact the left or right center frame 16A or 16B.

Figure 11:
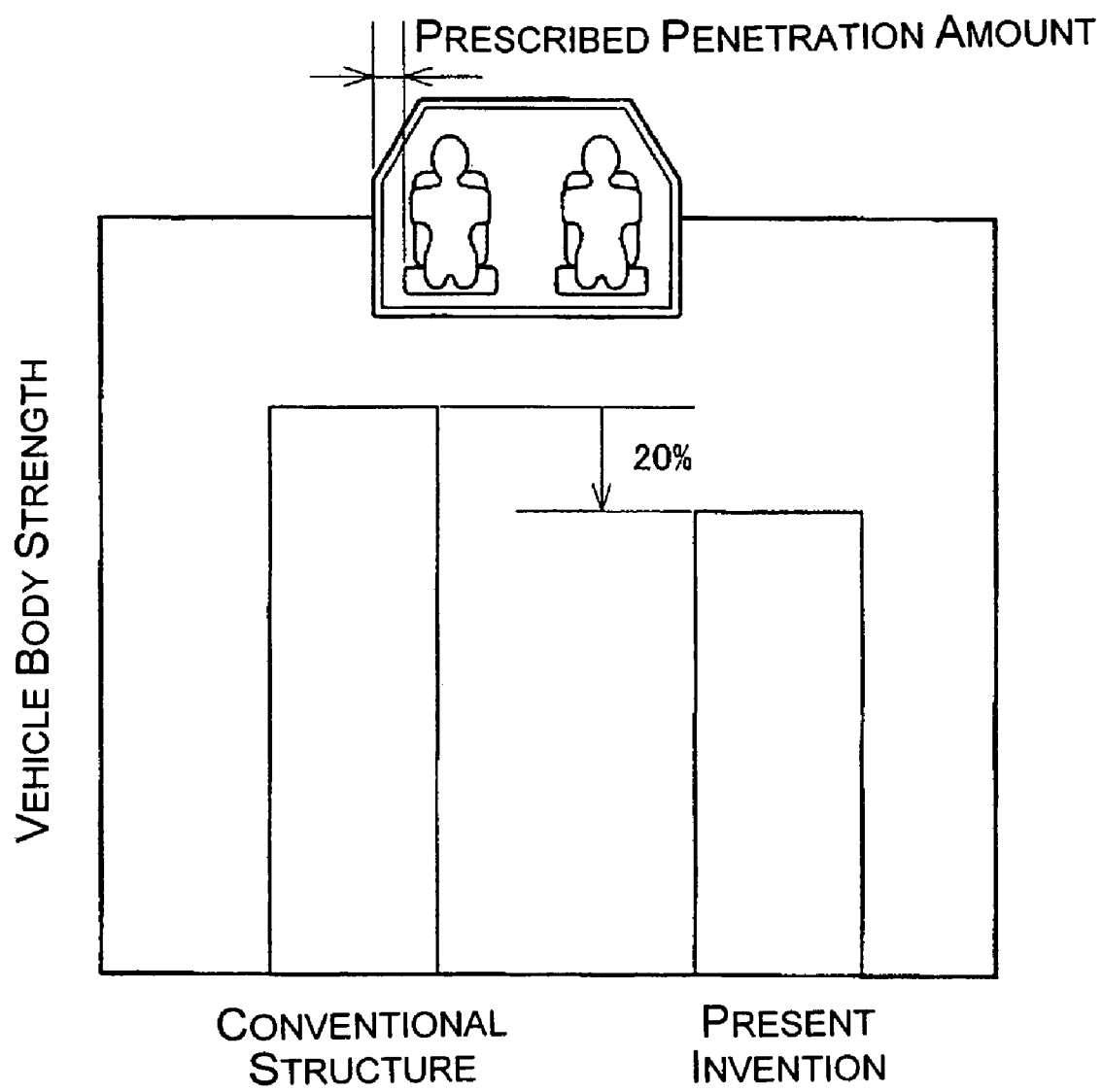
FIG. 11 is a diagrammatic chart illustrating the vehicle body strength required to achieve a prescribed cabin deformation amount based on the results of a side collision simulation for a conventional vehicle body structure and a vehicle body structure in accordance with the first embodiment of the present invention.

As a result, in an initial stage of a collision with a collision object at with a high speed, the degree of penetration caused by deformation at the place of impact against the cabin section 20 can be suppressed more efficiently and effectively, as shown in FIG. 11, because the inertial mass of the portion of the cabins section 20 that moves can be reduced. On the other hand, in a late stage of the collision, good protection of the occupants can be ensured because the cabin section 20 and the chassis frame 10 are prevented from separating as the mating members 50A and 50B engage with the left or right center frame 16A or 16B.

Since the readily deformable members 41 are arranged at the drawn-close portion N of the left and right center frames 16A and 16B at positions closer to center cross frame 15C than the mating members 50A and 50B, when the cabin section 20 moves relative to the chassis frame 10 during a front collision or a rear collision, the mating member 50A and 50B on the non-collision side moves between the left and right center frames 16A and 16B and crushes or shear-deforms the readily deformable member 41. As a result, the collision energy can be absorbed efficiently.

Moreover, the effects of the readily deformable members 41 are not limited to those exhibited during a collision. Since the readily deformable members 41 are fixed between the left and right center frames 16A and 16B even during normal travel, and thus, the readily deformable members 41 can provide improved rigidity of the chassis frame 10 by functioning as integral structural members with the left and right center frames 16A and 16B.

Figure 9:
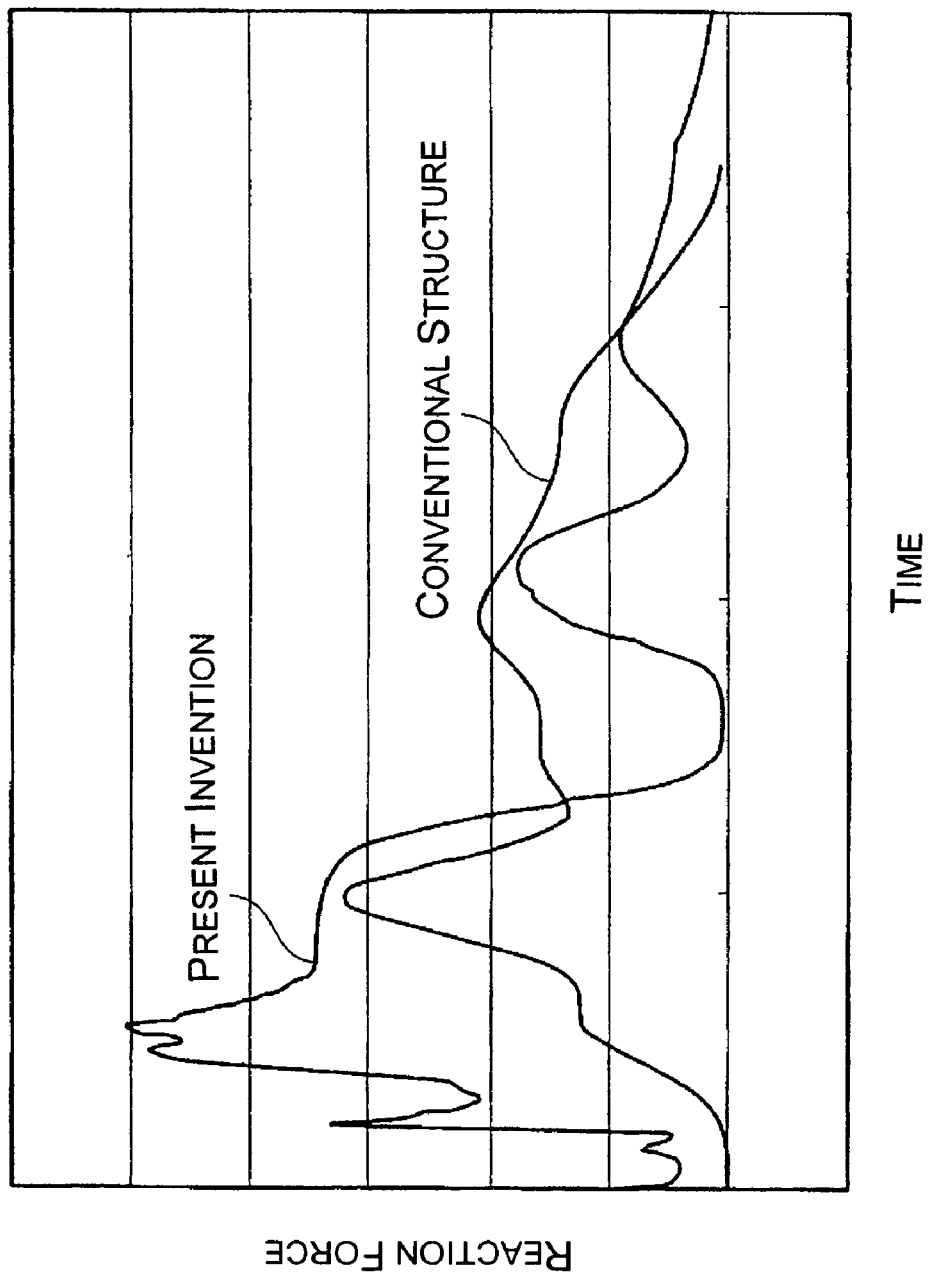
FIG. 9 is a simplified plot of the rigid wall reaction force versus time illustrating the results of a front collision simulation for a conventional vehicle body structure and the vehicle body structure in accordance with the first embodiment of the present invention.
Figure 10:
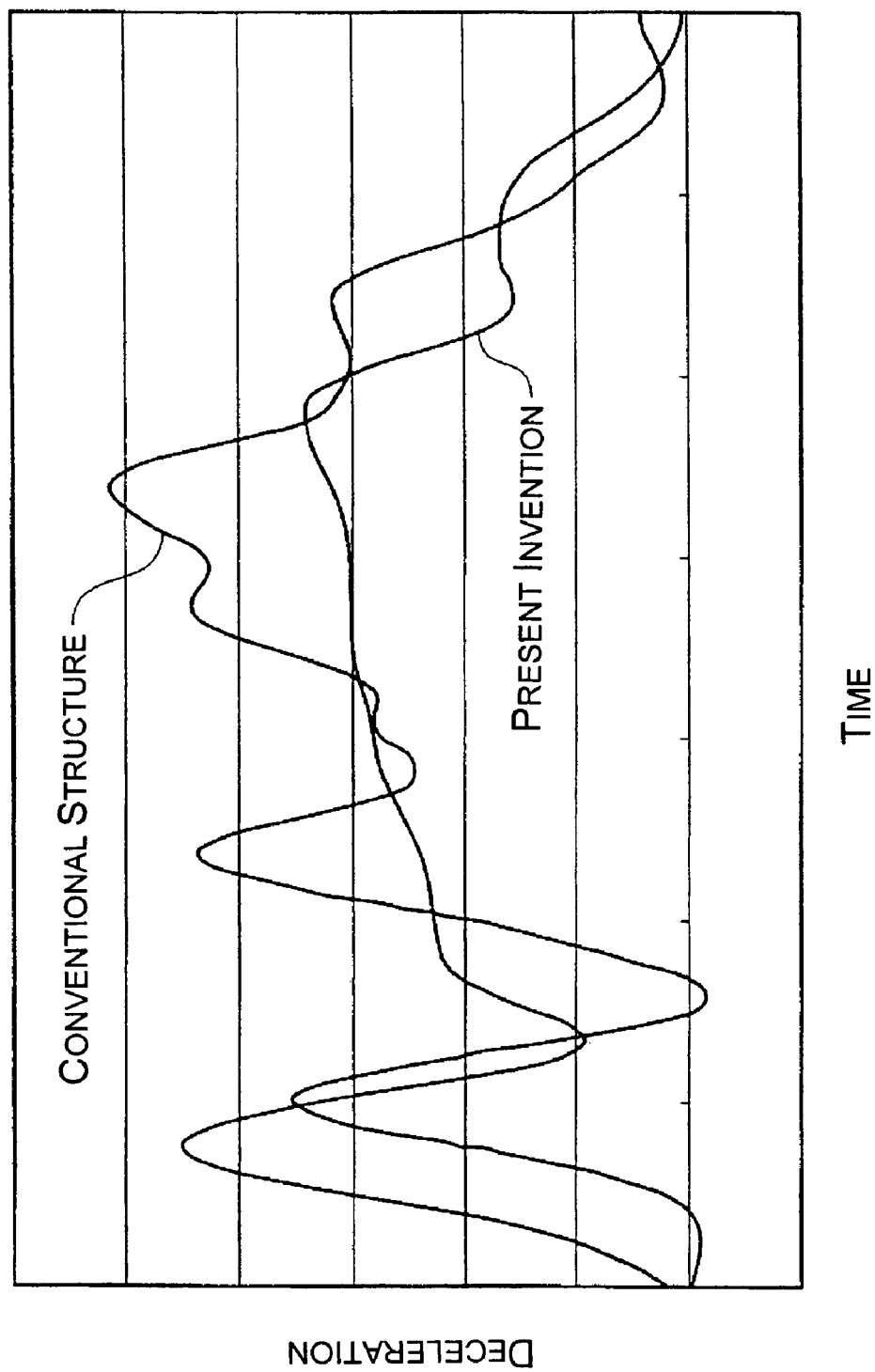
FIG. 10 is a simplified plot of the cabin deceleration versus time illustrating the results of a front collision simulation for a conventional vehicle body structure and the vehicle body structure in accordance with the first embodiment of the present invention.

Therefore, as shown in FIGS. 9 and 10, a vehicle body structure in accordance with the first embodiment is configured and arranged to ensure the strength with respect to the colliding object and alleviate the impact experienced by the vehicle occupants and ensure greater protection for the occupants.

Moreover, since the attitude stabilizing mechanisms 40 are preferably disposed between the chassis frame 10 and the cabin section 20 in four locations, i.e., at the front and rear end portions of the left and right side frames 14A and 14B, the clearance between the chassis frame 10 and the cabin section 20 can be absorbed during the normal use of the vehicle and the chassis frame 10 and cabin section 20 can be maintained at a prescribed attitude.

Since the attitude stabilizing mechanisms 40 are made of a substance (e.g., synthetic resin) having a lower elastic modulus than materials from which the chassis frame 10 and cabin section 20 are made, vibrations from the chassis frame 10 during normal travel are absorbed by the attitude stabilizing mechanisms 40 and the noise level in the cabin section 20 can be held down.

Since, in a top plan view, the left and right center frames 16A and 16B are shaped like trapezoids provided with prescribed interval sections K that extend parallel to the longitudinal direction of the vehicle including a portion of the drawn-close portion N where the left and right center frames 16A and 16B are coupled together by the center cross frame 15C, the behavior of the vehicle body in the transverse direction can be stabilized when the mating member 50A or 50B move between the drawn-close portion N during a front collision or a rear collision.

Each of the mating members 50A and 50B has a substantially T-shaped form comprising the holding arm 51 mounted to the lower framework of the cabin section 20 and the horizontal part 52 coupled to the bottom end of the holding arm 51 and oriented to extend in the transverse direction of the vehicle. The horizontal part 52 preferably has a transverse width W1 that is larger than a transverse width W2 of the space formed in the drawn-close portion N between the left and right center frames 16A and 16B. Moreover, the horizontal part 52 is arranged below the left and right center frames 16A and 16B. Thus, the holding arm 51 is configured and arranged to pass through the drawn-close portions N between the left and right center frames 16A and 16B and the horizontal part 52 is configured and arranged to form a latching part that prevents the cabin section 20 from lifting up by engaging the bottom surface of the drawn-close portion N of the left and right center frames 16A and 16B. As a result, a reliable latching function can be obtained while keeping the structure of the mating members 50A and 50B simple.

The holding arm 51 of the mating members 50A or 50B is formed to have the substantially vertical wall 51a on the side that faces the center cross frame 15C of the chassis frame 10 and the slanted part 51b on the side facing the opposite direction as the vertical wall 51a. Moreover, the slanted part 51b is configured to slant upward and away from the vertical wall 51a. Thus, the strength of the holding arm 51 increases as moving toward the top end of the holding arm 51 where the holding arm 51 is mounted to the lower framework of the cabin section 20. As a result, the holding arm 51 has an effective simple structure to support moments that act on the top end portion of the holding arm 51 due to longitudinal forces acting on the horizontal part 52 during a front or rear collision.

Moreover, since the side of the holding arm 51 that faces the center cross frame 15C and the readily deformable member 41, is the vertical wall 51a, the movement force of the mating members 50A or 50B is transmitted reliably to the readily deformable member 41 by the vertical wall 51a. As a result, the readily deformable member 41 can be efficiently crushed or shear-deformed and the collision energy can be effectively absorbed.

Furthermore, the vertical wall 51a is provided with the structurally weakened part 53 for promoting the collapse or deformation of the holding arm 51. Therefore, the holding arm 51 is configured and arranged to deform in a collapsing manner starting at the structurally weakened part 53 when the cabin section 20 moves relative to the chassis frame 10 in a front or rear collision and the holding arm 51 contacts the front or rear cross frame 15A or 15B of the floor section 11. As a result, an excessive increase in the resistance force opposing the relative movement of the cabin 20 is prevented from occurring and the movement is allowed to continue.

Although in the first embodiment, the readily deformable members 41 are used to generate a resistance force against the movement of the mating members 50A and 50B, this invention is not limited to such an arrangement. More specifically, the vehicle body structure of the present invention can be arranged such that the transverse width of the holding arms 51 of the mating members 50A and 50B wider than the transverse width of the space formed in the drawn-close portion N between the left and right center frames 16A and 16B and set the strength of the holding arms 51 and the mounting portion of the holding arm 51 higher than the strength of the left and right center frames 16A and 16B.

In such a case, when the mating member 50A or 50B moves between the drawn-close portion N of the left and right center frames 16A and 16B, the holding arm 51 is configured and arranged to push the left and right center frames 16A and 16B transversely outwardly as the holding arm 51 passes between the drawn-close portion N. Similarly to the deformation of the readily deformable member 41, the deformation of the left and right center frames 16A and 16B generates a resistance force and absorbs the collision energy.

In the first embodiment of the present invention, the cross sectional height h1 of the left and right side frames 14A and 14B is preferably set to be larger than the cross sectional height h2 of the left and right center frames 16A and 16B. Also, the top surface height position of the left and right side frames 14A and 14B is preferably set to be approximately equal to the top surface height position of the left and right center frames 16A and 16B. The position of the bottom end of the mating members 50A and 50B is configured and arranged to be higher than the bottom surface of the left and right side frames 14A and 14B. As a result, the bottom ends of the mating members 50A and 50B are arranged within the side projection planes of the left and right side frames 14A and 14B. Thus, the external appearance of the vehicle is improved.

Since the chassis frame 10 and the cabin section 20 are preferably formed by frame members and framework members that are hollow members having a rectangular or polygonal cross sectional shape, the strength of each member or each portion of the chassis frame 10 and the cabin section 20 can be set and ensured in a more efficient and effective manner.

However it will be apparent to those skilled in the art from this disclosure that the frame members and the framework members of the chassis frame 10 and the cabin section 20 are not limited to hollow members having a rectangular or polygonal cross sectional shape. More specifically, press formed members made by press forming steel, aluminum, or other panel materials and joining them together can be used as the frame members and framework members of the chassis frame 10 and/or the cabin section 20. In such a case, the press formed materials can be made with a high degree of design options with respect to shape. Moreover, the rigidity and strength of particular locations of the members can be easily increased. Furthermore, capital investment related to vehicle body manufacturing can be held to a minimum because existing vehicle manufacturing equipment can be utilized.

Moreover, all or a portion of the frame members and framework members of the chassis frame 10 and/or the cabin section 20 can be formed using a hydraulic forming method in which a closed cross sectional tubular member is molded using hydraulic pressure. With the hydraulic forming method, the rigidity and strength of the frame members and framework members of the chassis frame 10 and/or the cabin section 20 can be secured even more effectively and efficiently.

Furthermore, the frame members and framework members of the chassis frame 10 and/or the cabin section 20 can be formed as a space frame structure made primary of extruded members formed by extruding an aluminum alloy or other lightweight metal alloy and combined with cast parts and panel parts. With such a space frame structure, a high-rigidity, high-strength vehicle body that is lighter in weight can be obtained and the overall weight of the vehicle can be reduced.

Also, the frame members and framework members of the chassis frame 10 and/or the cabin section 20 can be made of fiber reinforced resin and formed as a single integral unit. With such a fiber reinforced resin unit, a high-rigidity, high-strength vehicle body can be obtained that is even lighter in weight and requires fewer manufacturing steps. As a result, the vehicle weight can be reduced and the productivity can be increased.

The chassis frame 10 can also be formed such that the front end section 13A and the rear end section 13B are detachable by making the front and rear end sections 13A and 13B as separate members from the chassis frame 10 and connecting the front end section 13A and rear end section 13B to the front kick-up section 12A and rear kick-up section 12B of the chassis frame 10 with bolts and nuts, for example. With such a detachable arrangement of the front and end sections 13A and 13B, the ability to repair the vehicle after a collision is improved. Also, a modular structure can be achieved in which component parts are attached to the front end section 13A and rear end section 13B in advance before mounting the front and rear end sections 13A and 13B to the front and rear kick-up sections 12A and 12B, respectively. Therefore, the productivity of manufacturing is improved.

Second Embodiment

Figure 12:
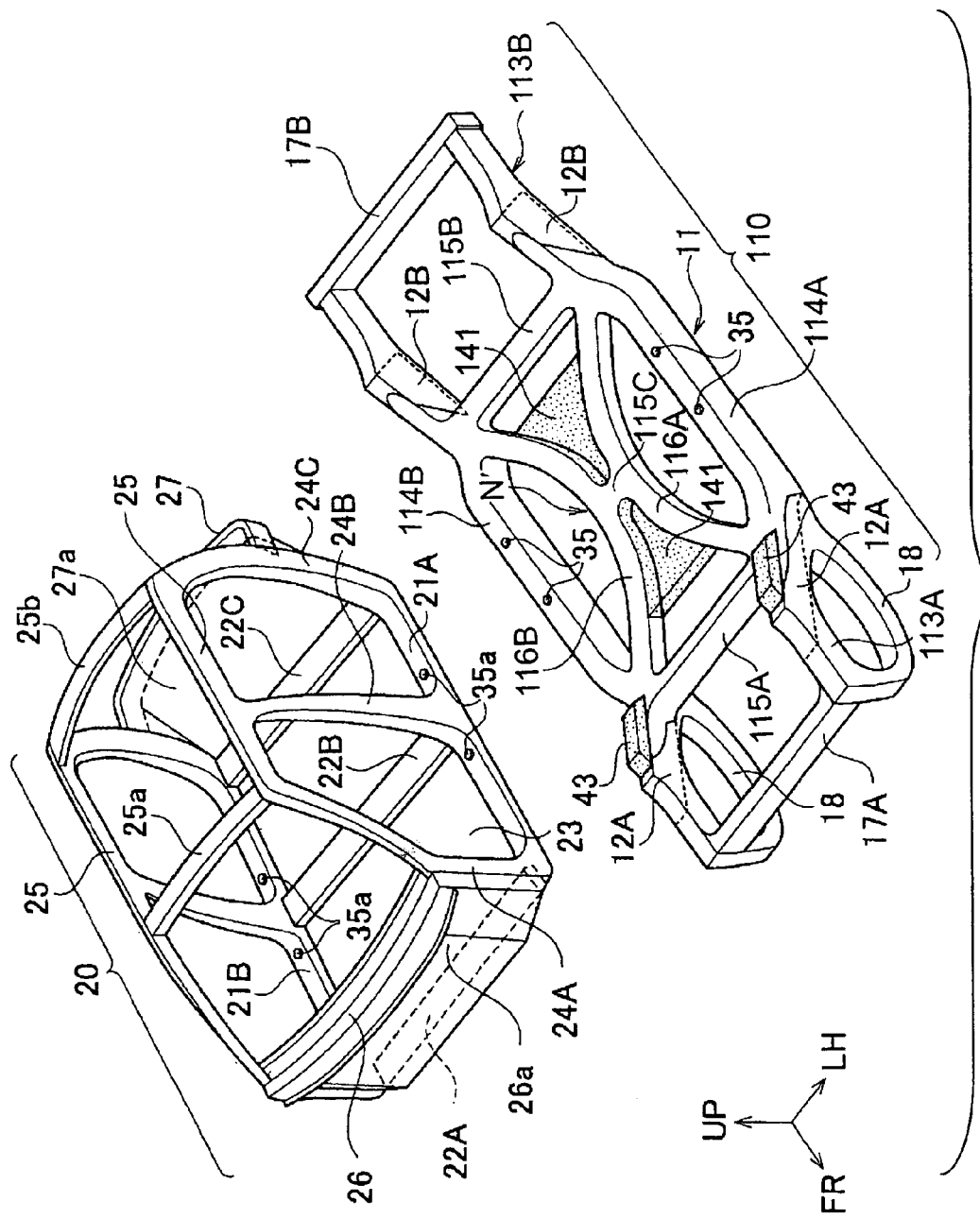
FIG. 12 is a simplified exploded front perspective view of a chassis frame and a cabin section of a vehicle body structure in accordance with a second embodiment of the present invention.

Referring now to FIG. 12, a vehicle body structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 12 is a simplified exploded front perspective view of a chassis frame 110 and the cabin section 20 of a vehicle body structure in accordance with a second embodiment of the present invention. As shown in FIG. 12, the vehicle body structure according to the second embodiment is basically identical to the vehicle body structure of the first embodiment, except that the chassis frame 110 is substituted for the chassis frame 10 of the first embodiment. More specifically, the chassis frame 110 of the second embodiment differs from the chassis frame 10 of the first embodiment in that a pair of left and right center frames 116A and 116B are shaped like arcs or curves having apexes in the drawn-close portion N' (i.e., the frame portion where the left and right center frames 116A and 116B are connected together by the center cross frame 115C. Thus, the cabin section 20 includes the mating members 50A and 50B in the same manner as the first embodiment, even though not shown.

Moreover, in the second embodiment, two readily deformable members 43 are preferably disposed in spaces between the cabin section 20 and the slanted surfaces of the front kick-up section 12A of the chassis frame 110. The readily deformable members 43 are preferably fixedly coupled to the slanted surfaces of the kick-up section 12A of the chassis frame 110. The readily deformable members 43 are preferably made of a substance, such as synthetic resin, that has a lower strength than frame members and framework members of the chassis frame 10 and the cabin section 20.

Furthermore, in the second embodiment, the front end section 113A is preferably provided with a lower frame 18 to obtain a vertically-two-leveled frame structure of the front end section 11 3A.

As seen in FIG. 12, the left and right side frames 114A and 114B of the chassis frame 110 are preferably arranged offset transversely outwardly relative to the front and rear kick-up sections 12A and 12B. The front and rear ends of the left and right side frames 114A and 114B are curved transversely inwardly to couple to the front and rear kick-up sections 12A and 12B.

Moreover, in the second embodiment, the cabin section 20 is preferably coupled to the chassis frame 110 at locations of the left and right side-edge framework members 21A and 21B. More specifically, the left and right side-edge framework members 21A and 21B are preferably provided with a plurality of holes 35a on positions that are front and rear of where the center pillars 24B extend from the left and right side-edge framework members 21A and 21B. The left and right side frames 114A and 114B of the chassis frame 110 and the left and right side-edge framework members 21A and 21B of the cabin section 20 are fastened or coupled together by the shear bolts 33 inserted through the holes 35a of the cabin section 20 and a plurality of holes 35 provided on the left and right side frames 114A and 114B of the chassis frame 110. The shear bolts 33 and the arrangements of fastening the shear bolts 33 used in the second embodiment are identical to those in the first embodiment.

Accordingly, in the vehicle body structure of the second embodiment, as viewed in a plan view, the left and right center frames 116A and 116B are shaped like arcs or curves having the apexes of the arcs or curves at the a drawn-close portion N' where the left and right center frames 116A and 116B are joined together by the center cross frame 115C. As a result, a space that is surrounded by the left and right center frames 116A and 116B and the left and right side frames 114A and 114B can be formed more efficiently than in the first embodiment.

Since the readily deformable members 43 are arranged in the spaces between the cabin section 20 and the slanted surfaces of the front kick-up section 12A, the cabin section 20 is configured and arranged to compress and shear-deform the readily deformable members 43 as the cabin section 20 moves relative to the chassis frame 110 during a front collision. Therefore, the cabin section 20 is imparted with an appropriate resistance force from the readily deformable members 43. As a result, the collision energy can be absorbed with good efficiency. Of course, it will be apparent to those skilled in the art from this disclosure that the readily deformable members 43 can also be disposed in spaces between the cabin section 20 and the slanted surfaces of the rear kick-up section 12B of the chassis frame 110 in order to absorb the energy during a rear collision.

Since the front end section 113A is provided with the lower frame 18 to obtain a vertically-two-leveled frame structure, the load transmission path in the front end section 1 13A during a front collision is arranged such that the load is transmitted from the front end section 113A to a lower part of the chassis frame 10 through the lower frame 18. As a result, an object colliding with the front of the vehicle can be born more reliably by the front end section 113A as the load is dispersed in the vertical direction. Thus, the front end section 113A can be strengthened in a simple manner. This vertically two-leveled frame structure can also be applied to the rear end section 113B to accommodate rear collisions.

Third Embodiment

Figure 13:
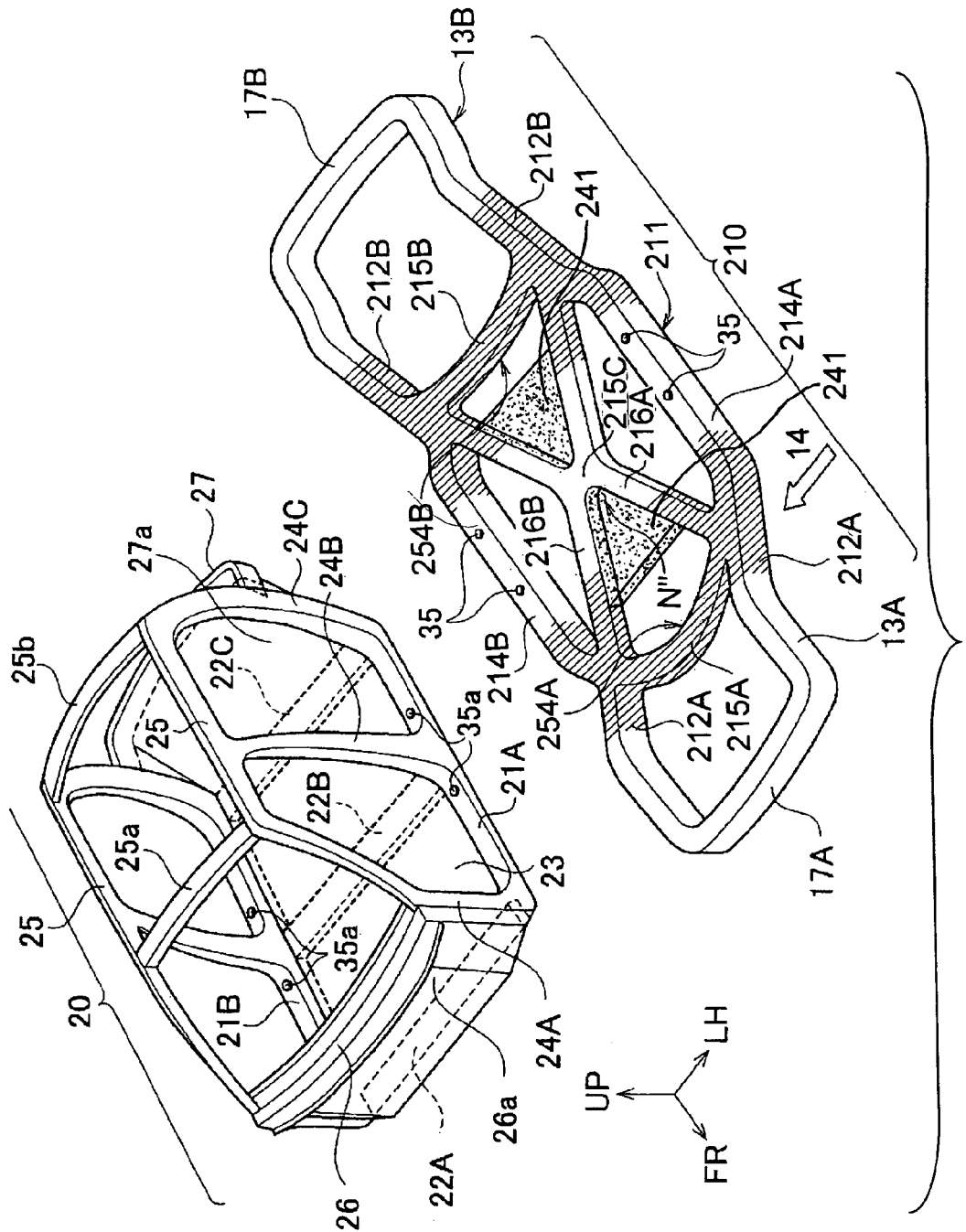
FIG. 13 is a simplified exploded front perspective view of a chassis frame and a cabin section of a vehicle body structure in accordance with a third embodiment of the present invention.
Figure 14:
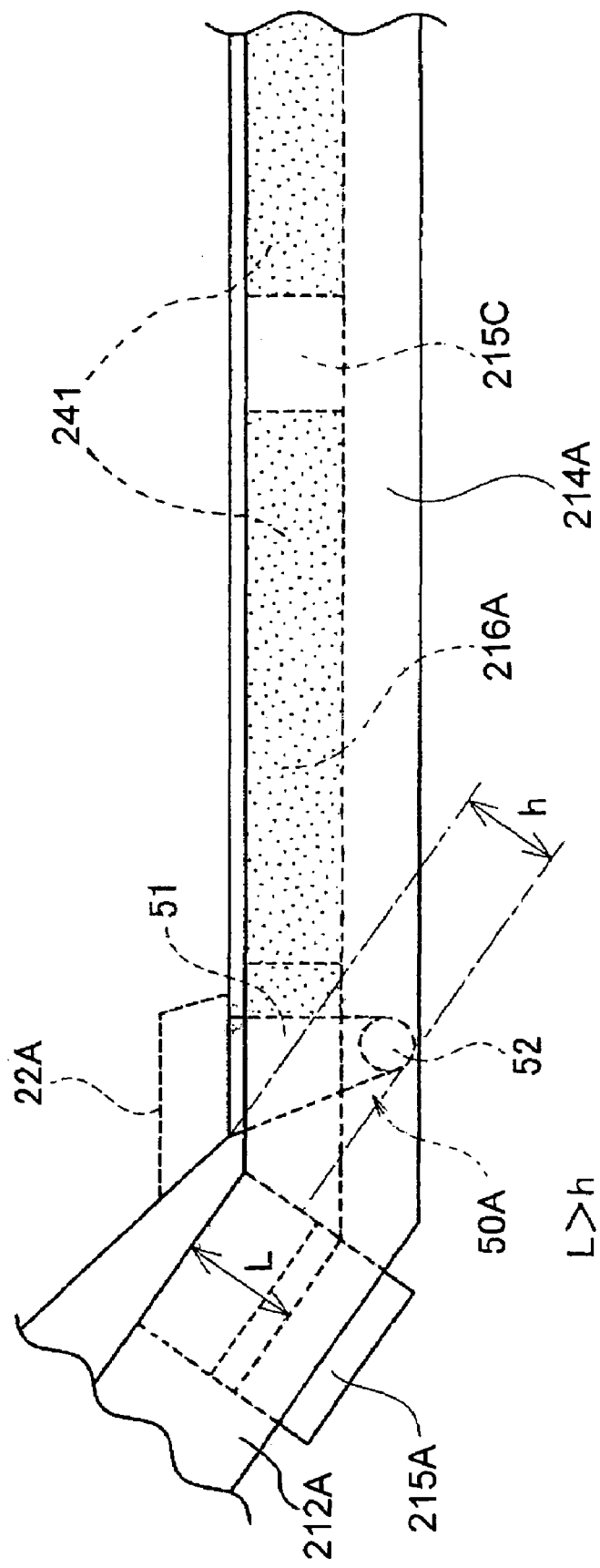
FIG. 14 is an enlarged partial side elevational view of a chassis frame, a cabin section, a mating member and a readily deformable member of a vehicle body structure viewed in a direction indicated by arrow 14 in FIG. 13 when the chassis frame, the cabin section, the mating member and the readily deformable member are assembled together in accordance with the third embodiment of the present invention.

Referring now to FIGS. 13 and 14, a vehicle body structure in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 13 is a simplified exploded front perspective view of a chassis frame 210 and the cabin section 20 of a vehicle body structure in accordance with the third embodiment of the present invention. As shown in FIG. 13, the vehicle body structure according to the third embodiment is basically identical to the vehicle body structure of the first embodiment, except that a chassis frame 210 is substituted for the chassis frame 10 of the first embodiment. More specifically, the chassis frame 210 of the second embodiment differs from the chassis frame 10 of the first embodiment in that a pair of left and right center frames 216A and 216B are, in a plan view, shaped like triangles having apexes of the triangles at the places where a drawn-close portions N" of the left and right center frames 216A and 216B connect to the center cross frame 215C.

Moreover, in the third embodiment of the present invention, two front and rear cross frames 215A and 215B are provided with recessed parts 254A and 254B for avoiding interference between the front and rear cross frames 215A and 215B and the mating members 50A and 50B. The recessed parts 254A and 254B are curved so as to protrude diagonally downward with apexes located at the transversely center portion of a pair of front and rear cross frames 215A and 215B. In other words, the front and rear cross frames 215A and 215B are curved downwardly relative to the inclined center plane of the front and rear kick-up sections 212A and 212B to avoid interference with the mating members 50A and 50B when the cabin section 20 rides up one of the front and rear kick-up sections 212A and 212B.

FIG. 14 is an enlarged partial side elevational view of the chassis frame 210, the cabin section 20, the mating member 50A and the readily deformable member 241 of a vehicle body structure viewed in a direction indicated by an arrow 14 in FIG. 13 when the chassis frame 210, the cabin section 20, the mating member 50A and the readily deformable member 241 are assembled in accordance with the third embodiment. As shown in FIG. 14, the length h of the mating members 50A and 50B as measured along a direction perpendicular to the longitudinal axes of the front and rear kick-up sections 212A and 212B is smaller than the amount of curve offset L of the front and rear cross frames 215A and 215B in the same direction. Thus, since the front and rear cross frames 215A and 215B are curved downwardly to form the curved offsets L, the mating members 50A and 50B will not interfere with the front and rear cross frames 215A and 215B when the cabin section rides up one of the front and rear kick-up sections 212A and 212B.

Moreover, the chassis frame 210 are preferably formed with frame members made by joining steel, aluminum, or other panel materials of different thicknesses together to obtain a tailored blank, working the tailored blank into a bag-like form, and molding the bag-like form using a hydraulic forming method to obtain an integral unit. More specifically, the areas shown as shaded areas in FIG. 13 near border portions between a floor section 211 and the front and rear kick-up sections 212A and 212B are preferably formed with larger wall thicknesses than the other areas of the chassis frame 210.

Accordingly, since the left and right center frames 216A and 216B that are, in a plan view, shaped like triangles having apexes at the positions where the drawn-close portions N" of the left and right center frames 216A and 216B coupled to the center cross frame 15C, the left and right center frames 216A and 216B of the vehicle body structure according to the third embodiment are configured and arranged to function as truss members in a front collision, a rear collision, and a side collision. As a result, the strength of the chassis frame 210 is increased, and thus, the weight of the vehicle body can be reduced.

Since the front and rear cross frames 215A and 215B are provided with the recessed parts 254A and 254B for avoiding interference with the mating member 50A and 50B, contact between the mating member 50A or 50B and the front or rear cross frame 215A or 215B on the collision side can be prevented. Thus, the behavior of the cabin section 20 can be stabilized when the cabin section 20 moves relative to the chassis frame 210 during a front collision or rear collision.

Also, the chassis frame 210 are preferably formed with the frame members made by joining steel, aluminum, or other panel materials of different thicknesses together to obtain a tailored blank, working the tailored blank into a bag-like form, and molding the bag-like form using a hydraulic forming method to obtain an integral unit. Thus, the number of parts can be greatly reduced. Accordingly, productivity of manufacturing can be increased.

The method of making members by working a tailored blank into a bag-like form and molding the bag-like form using a hydraulic forming method is not limited to the frame members of the chassis frame 210. The method can also be applied to form the framework members of the cabin section 20.

Fourth Embodiment

Figure 15:
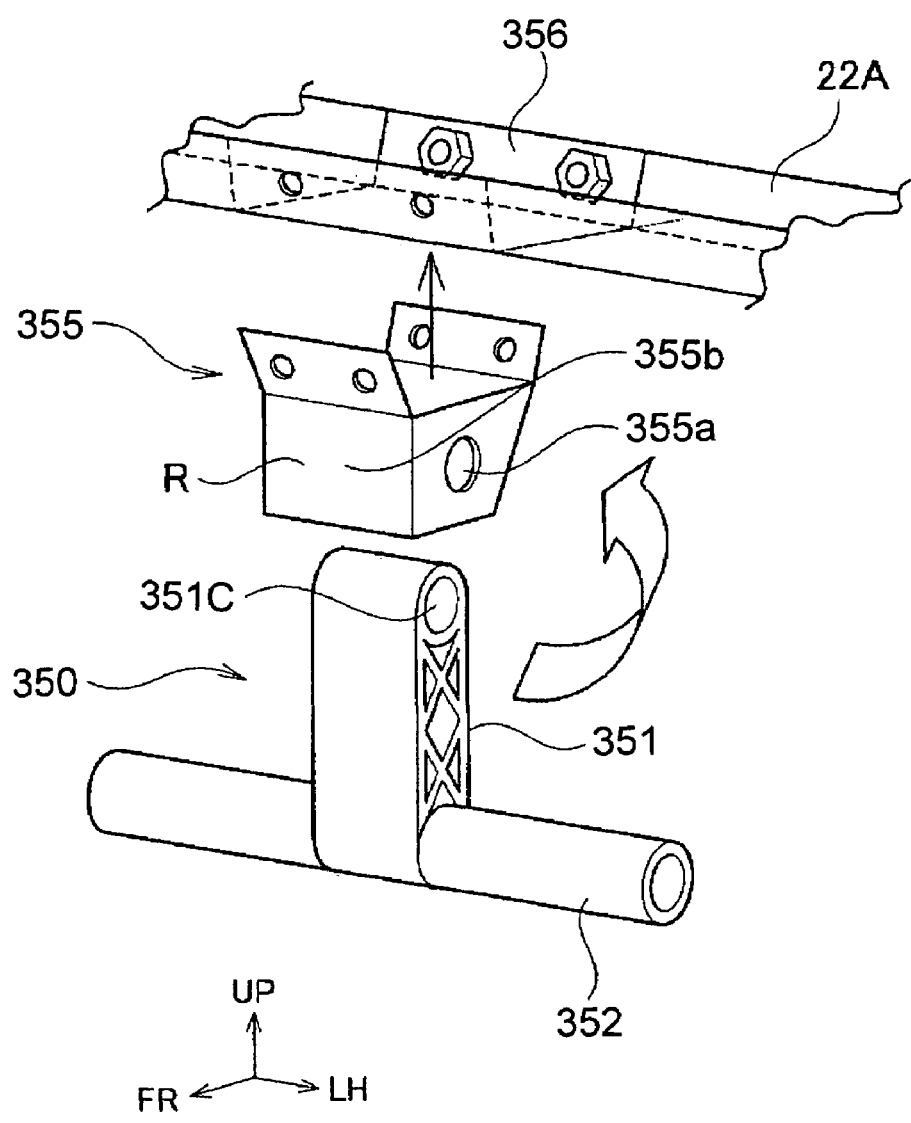
FIG. 15 is an enlarged partial exploded perspective view of a mating member and a cabin section of a vehicle body structure illustrating how the mating member is mounted on the cabin section in accordance with a fourth embodiment of the present invention.

Referring now to FIG. 15, a vehicle body structure in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 15 is an enlarged partial exploded perspective view of a mating member 350 and the cabin section 20 of the vehicle body structure illustrating how the mating member 350 is mounted on the cabin section 20 in accordance with the fourth embodiment of the present invention. Basically, the vehicle body structure of the fourth embodiment is identical to the vehicle body structure of the first embodiment, except for a pair of mating members 350 have been substituted for the mating members 50A and 50B of the first embodiment.

As shown in FIG. 15, in the fourth embodiment, the mating member 350 is coupled to a swing restriction mechanism R. More specifically, a holding arm 351 of the mating member 350 is connected at an upper end of the mating member 350 to the lower framework of the cabin section 20 in such a manner that the mating member 350 can swing toward the center cross frame 15C (shown in FIG. 1) but the mating member 350 is prevented from swinging in the other direction (i.e., a direction away from the center cross frame 15C) by a swing restricting mechanism R.

The holding arm 351 and a horizontal part 352 of the mating member 350 of the fourth embodiment is preferably made of extruded aluminum and has a substantially uniform width in the longitudinal direction of the vehicle in a side view. The upper end part of the holding arm 351 is mounted to the front transverse framework member 22A as shown in FIG. 15 of the cabin section 20 with a mounting bracket 355.

The holding arm 351 is preferably coupled to the mounting bracket 355 with a pin that passes through a mounting hole 351C extend transversely in the upper end of the holding arm 351 and mounting holes 355a in the mounting bracket 355. Therefore, the holding arm 351 is mounted to the mounting bracket 355 in a pendulum-like manner such that the mating member 350 can swing freely forward and rearward.

However, the mounting bracket 355 includes a restriction wall 355b that is configured to function as the swing restricting mechanism R for the mating member 350 as seen in FIG. 15. Thus, the holding arm 351 of the mating member 350 is prevented from swinging outwardly away from the longitudinal center portion of the vehicle in the forward direction. In other words, the swing restricting mechanisms R is configured to permit the mating member 350 to swing toward the rear of the vehicle but prevent the mating member 350 from swinging toward the front of the vehicle.

Likewise, an additional mating member 350 is mounted on the rear transverse framework member 22C of the cabin section 20 by using an additional mounting bracket 355. The additional mating member 350 is mounted such that the restriction wall 355b is oriented toward the rear of the vehicle. Thus, the mating member 350 can swing toward the center cross frame 15C (shown in FIG. 1) in the forward direction but the mating member 350 is prevented from swinging in the rear direction (i.e., a direction away from the center cross frame 15C) by the swing restricting mechanism R.

Moreover, as seen in FIG. 15, reinforcing members 356 are preferably provided on the portions of the front and rear transverse framework members 22A and 22C where the mating member 350 are mounted to increase the mounting strength of the mating members 350.

Accordingly, with the vehicle body structure of the fourth embodiment, when the cabin section 20 moves relative to the chassis frame 10 during a front collision or a rear collision and the mating member 350 on the collision side contacts the front or rear cross frame 15A or 15B, the mating member 350 swings toward the non-collision side instead of exerting a force against the front or rear cross frame 15A or 15B. Thus, the generation of a resistance force by the mating member 350 is avoided and the behavior of the cabin section 20 during a collision can be stabilized.

On the other hand, the holding arm 351 of the mating member 350 on the non-collision side is prevented from swinging by the swing restricting mechanism R when the mating member 350 on the non-collision side contacts the readily deformable member 41 (see FIG. 1) between the left and right center frames 16A and 16B or the center cross frame 15C. Consequently, the holding arm 351 of the mating member 350 on the non-collision side generates a resistance force by crushing or shear-deforming the readily deformable member 41 or hitting the center cross frame 15C and the collision energy can be absorbed efficiently.

It will be apparent to those skilled in the art from this disclosure that the mating members 350 can also be adapted to the vehicle body structure of the second embodiment or the third embodiment.

Fifth Embodiment

Figure 16:
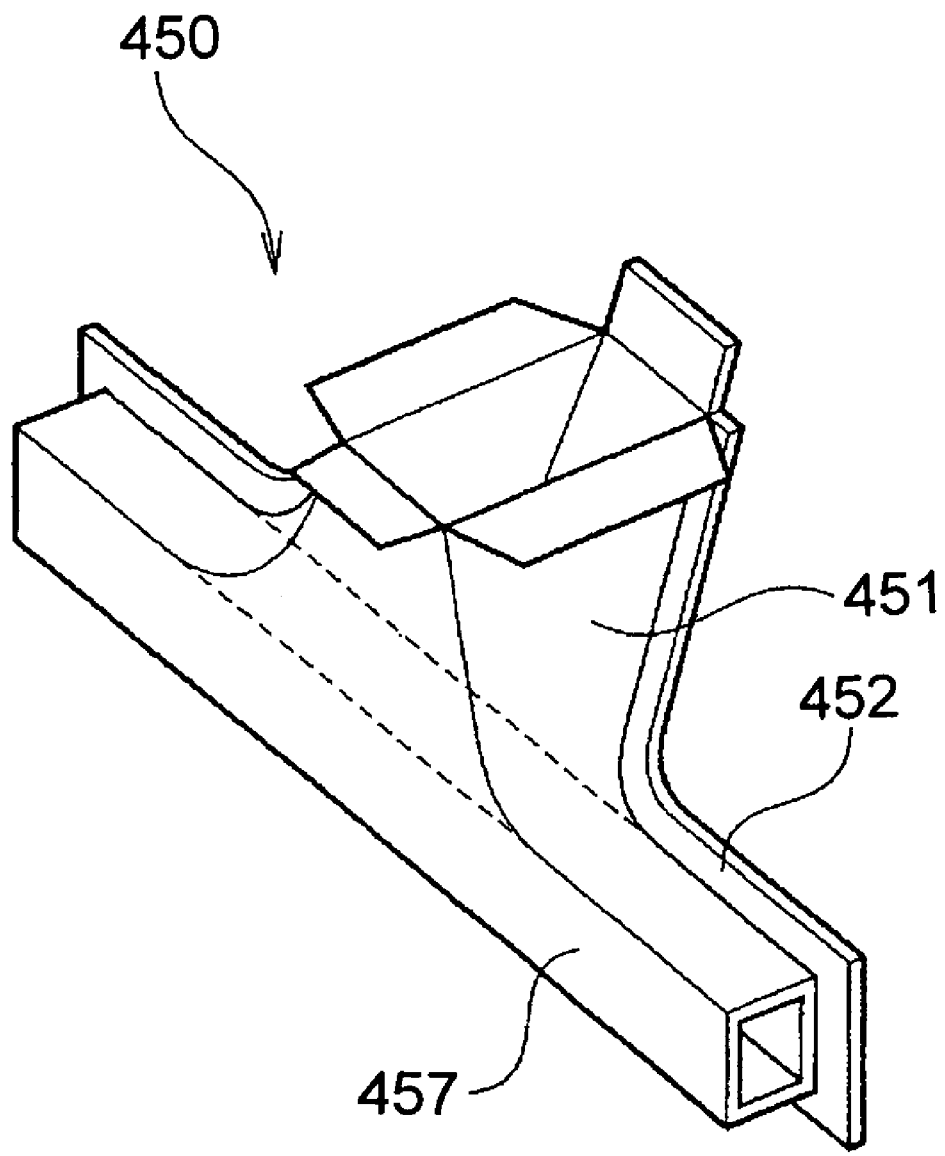
FIG. 16 is an enlarged perspective view of a mating member of a vehicle body structure in accordance with a fifth embodiment of the present invention.
Figure 16:
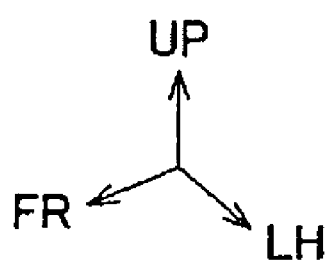

Referring now to FIG. 16, a vehicle body structure in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

FIG. 16 is an enlarged perspective view of a mating member 450 of the vehicle body structure in accordance with the fifth embodiment of the present invention. The vehicle body structure of the fifth embodiment is identical to the vehicle body structure of the first embodiment, except that a pair of mating members 450 have been substituted for the mating members 50A and 50B of the first embodiment.

As shown in FIG. 16, in the fifth embodiment, a holding arm 451 and a horizontal part 452 of the mating member 450 are preferably made by press forming panel materials and joining them together. Moreover, the horizontal part 452 is provided with a tubular member 457 oriented in the lengthwise direction of the horizontal part 452.

Accordingly, with the fifth embodiment, the mating members 450 can be made with a high degree of design options with respect to shape because the mating members 450 are press formed. Moreover, the strength of the horizontal member 452 can be increased because of the tubular member 457 is provided to reinforce the horizontal member 452. As a result, a large resistance force against bending of the horizontal part 452 can be generated when the mating member 450 engages with the left and right center frames 16A and 16B to suppress upward movement of the non-collision side of the cabin section 20 during a front collision or a rear collision.

It will be apparent to those skilled in the art from this disclosure that the mating members 450 can also be adapted to the vehicle body structure of the second embodiment or the third embodiment.

Sixth Embodiment

Figure 17:
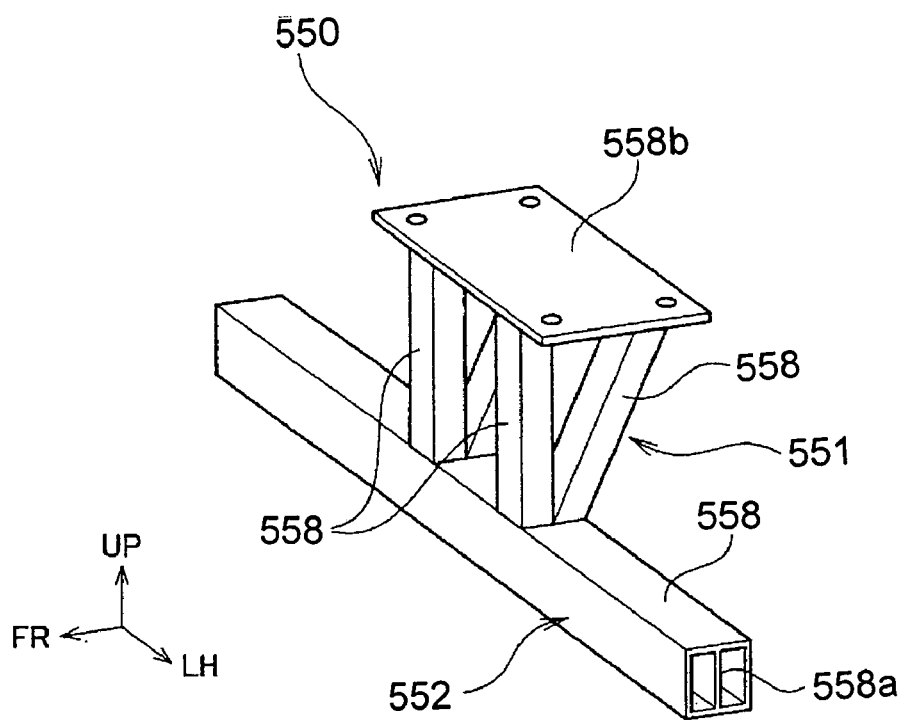
FIG. 17 is an enlarged perspective view of a mating member of a vehicle body structure in accordance with a sixth embodiment of the present invention.
Figure 18:
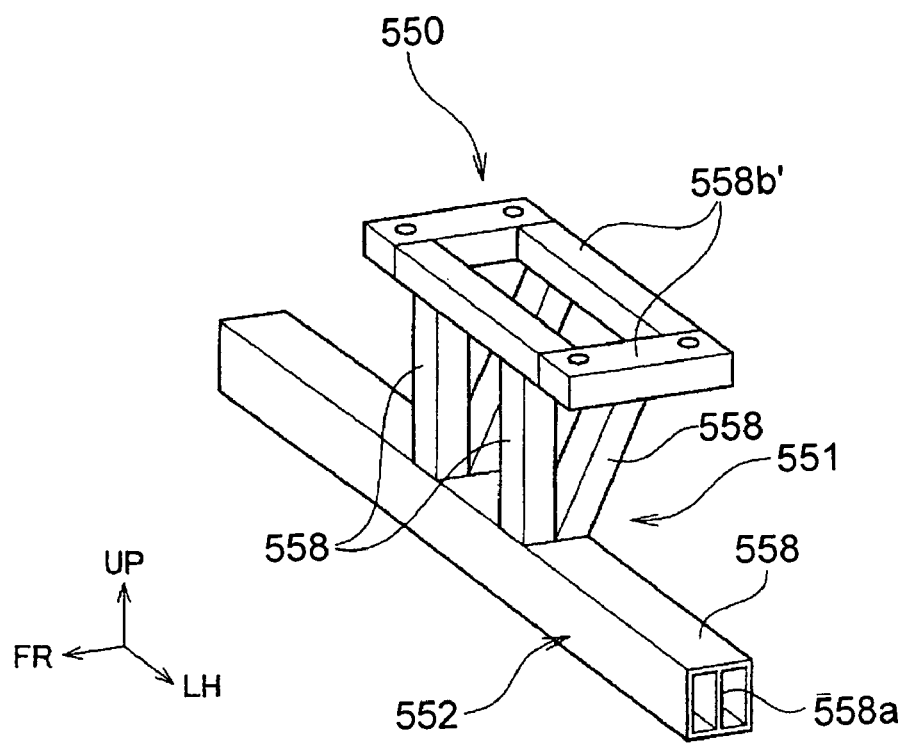
FIG. 18 is an enlarged perspective view of an alternative structure of the mating member of the vehicle body structure in accordance with the sixth embodiment of the present invention.

Referring now to FIGS. 17 and 18, a vehicle body structure in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

FIG. 17 is an enlarged perspective view of a mating member 550 of the vehicle body structure in accordance with the sixth embodiment of the present invention. Basically, the vehicle body structure of the sixth embodiment is identical to the vehicle body structure of the first embodiment, except for a pair of mating member 550 have been substituted for the mating member 50A and 50B.

As seen in FIG. 17, in the vehicle body structure of the sixth embodiment, a holding arm 551 and a horizontal part 552 of the mating member 550 are made by assembling a plurality of parts 558 that were made using a hydraulic forming method. Moreover, the horizontal part 552 is reinforced with a rib 558a.

In the sixth embodiment, a plate 558b is coupled to the upper end of each of the parts 558 of the holding arm 551. The mating members 550 are mounted to the front and rear transverse framework members 22A and 22C by coupling the plates 558b to the front and rear transverse framework members 22A and 22C.

Accordingly, with the sixth embodiment, costs can be reduced because the mating members 550 are made with a combination of the parts 558 formed hydraulically. Moreover, a large resistance force against bending of the horizontal part 552 can be obtained when the mating member 550 engages to the left and right center frames 16A and 16B to suppress upward movement of the non-collision side of the cabin section 20 during a front collision or a rear collision because the horizontal part 552 is reinforced with the rib 558a.

Alternatively, the plate 558 of the mating member 550 of the sixth embodiment can also be formed with additional hydraulically formed parts 558' assembled into a rectangular shape member 558b' instead of using the plate 558b as shown in FIG. 18.

It will be apparent to those skilled in the art from this disclosure that the mating members 550 can also be adapted to the vehicle body structure of the second embodiment or the third embodiment.

Seventh Embodiment

Figure 19:
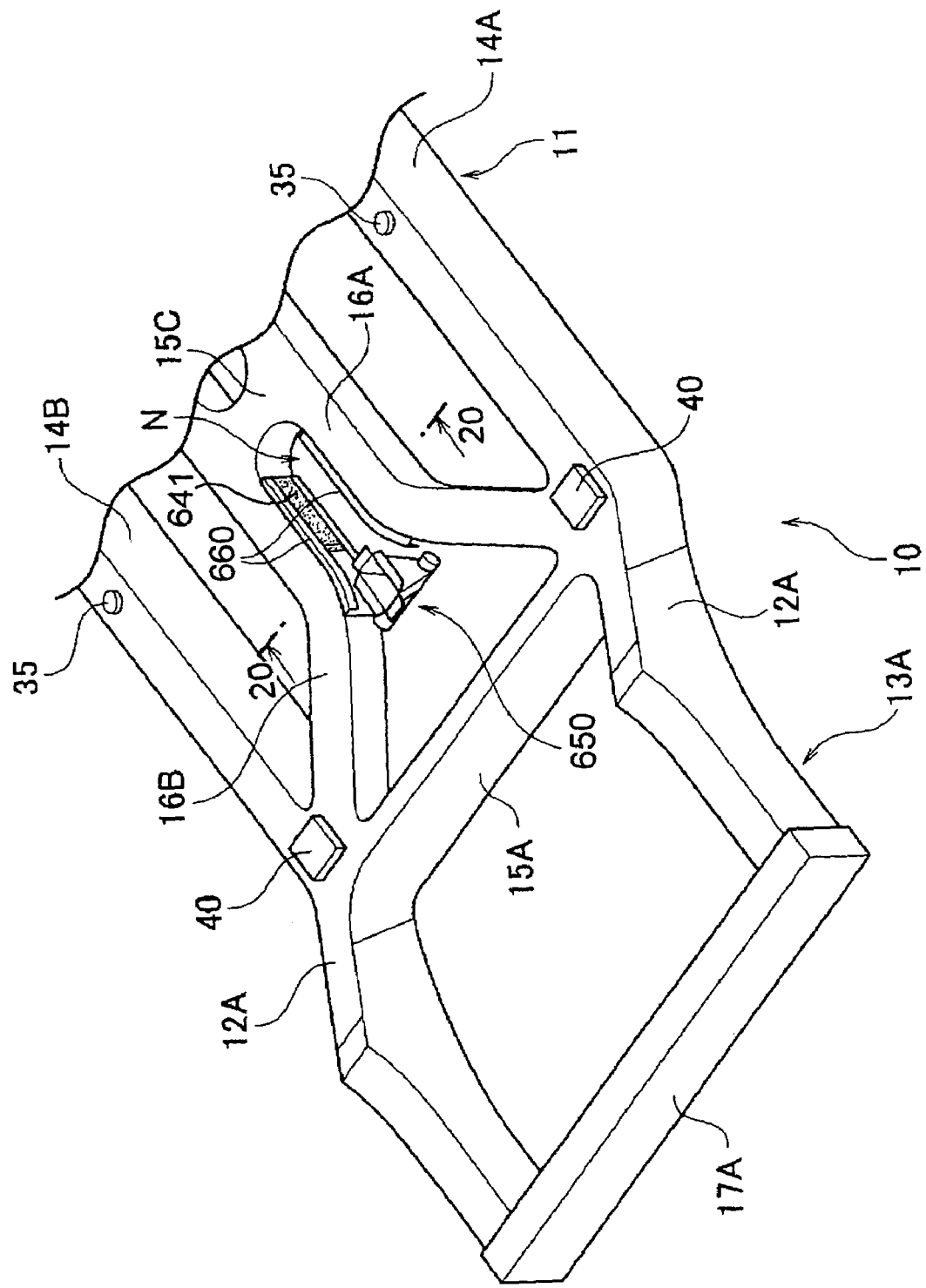
FIG. 19 is an enlarged partial perspective view of a front half of the chassis frame, a mating member and open cross section members of a vehicle body structure in accordance with the sixth embodiment of the present invention.
Figure 20:
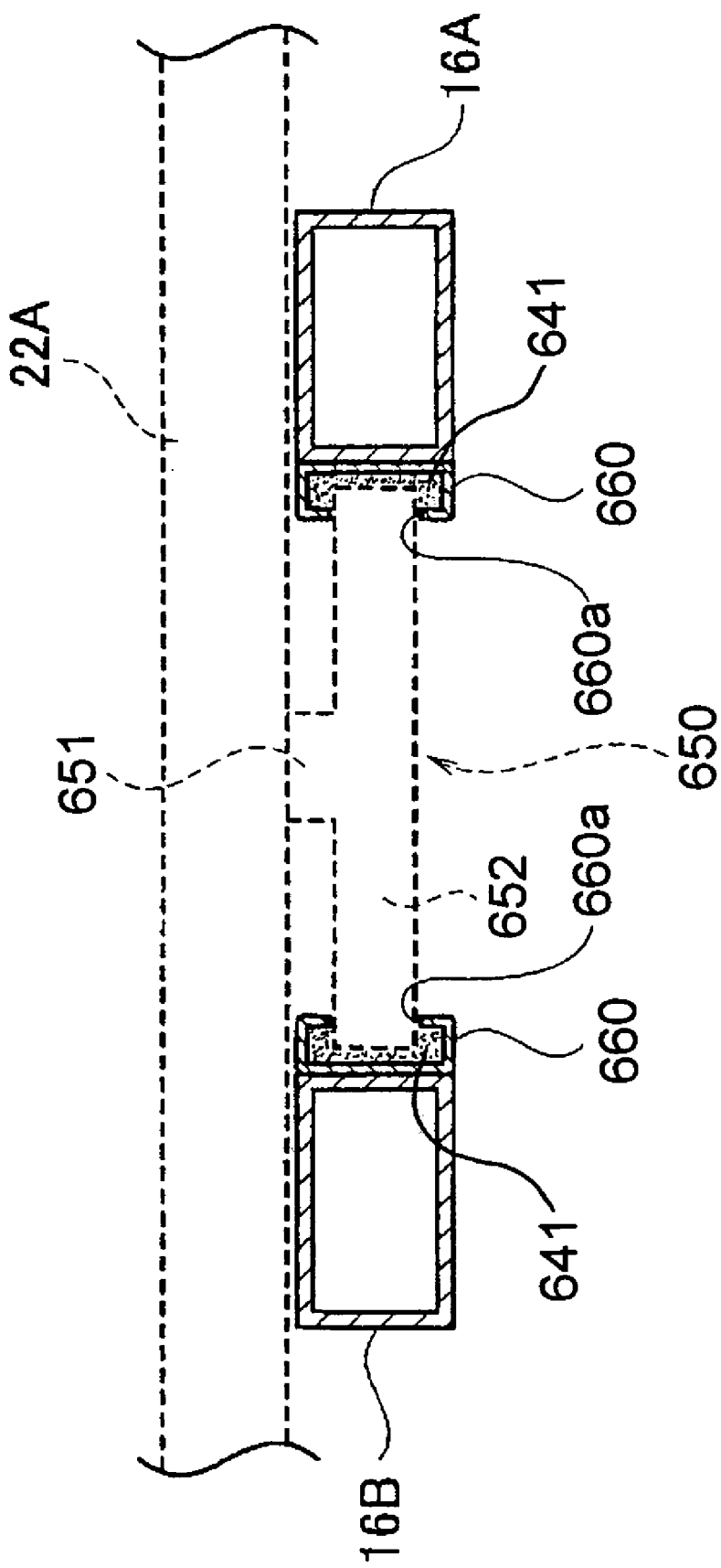
FIG. 20 is an enlarged cross sectional front elevational view of the chassis frame, the mating member, the open cross section members, and a cabin section of a vehicle body structure taken along section line 20—20 of FIG. 19 when the chassis frame, the mating member, the open cross section members and the cabin section are assembled together in accordance with the seventh embodiment of the present invention.
Figure 21:
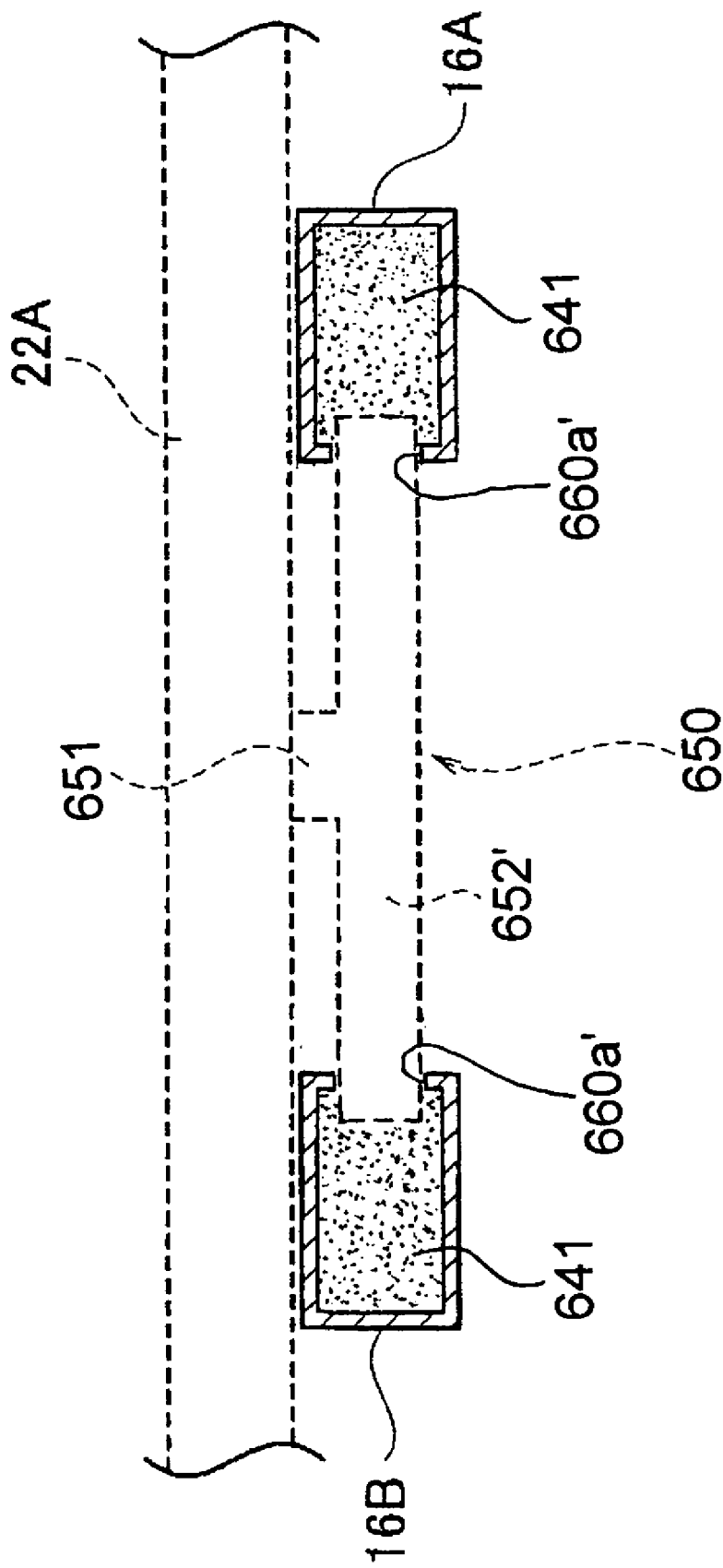
FIG. 21 is an enlarged cross sectional front elevational view of a chassis frame, a mating member, and a cabin section of a vehicle body structure when the chassis frame, the mating member, and the cabin section are assembled together in accordance with an alternative embodiment of the seventh embodiment of the present invention.

Referring now to FIGS. 19–21, a vehicle body structure in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

FIG. 19 is an enlarged partial perspective view of a front half of the chassis frame 10 (identical to first embodiment), a mating member 650 and a pair of open cross section members 660 of the vehicle body structure in accordance with the seventh embodiment of the present invention. FIG. 20 is an enlarged cross sectional front elevational view of the chassis frame 10, the mating member 650, the open cross section members 660, and the cabin section 20 of the vehicle body structure taken along a section line 20—20 of FIG. 19 when the chassis frame 10, the mating member 650, the open cross section members 660, and the cabin section 20 are assembled together. The vehicle body structure of the seventh embodiment is basically identical to the vehicle body structure of the seventh embodiment, except that the mating members 650 and the open cross section members 660 have been substituted for the mating members 50A and 50B of the first embodiment.

As shown in FIGS. 19 and 20, the vehicle body structure of the seventh embodiment includes the open cross section members 660 mounted to a pair of mutually facing surfaces of at least the drawn-close portion N of the left and right center frames 16A and 16B. The open cross section members 660 are disposed such that the open sides of the open cross section members 660 are facing each other. The mating member 650 is configured and arranged such that both ends of a horizontal part 652 of the mating member 650 are movably inserted into openings 660a of the open cross section members 660 as seen in FIG. 20.

The insides of the open cross section members 660 are filled with a readily deformable material 641 along portions of the open cross section members 660 that are located toward the center cross frame 15C from the portions where the horizontal part 652 of the mating member 650 is inserted. The readily deformable material 641 is preferably a substance that has a smaller deformation strength than the materials from which the chassis frame 10, cabin section 20, and mating member 650 are made, e.g., foamed metal, light metal honeycomb material, or foamed resin. An additional mating member 650 and additional pair of the open cross section members 660 are provided in the rear side of the drawn-close portion N of the left and right center frames 16A and 16B. The additional open cross section members 660 are filled with the readily deformable material 641 along portions of the additional open cross section members 660 that are located toward the center cross frame 15C from the portions where the horizontal part 652 of the additional mating member 650 is inserted.

Accordingly, with the seventh embodiment, since open cross section members 660 with the openings 660a for inserting both ends of the horizontal part 652 of the mating member 650 are mounted to the mutually facing surfaces of at least the drawn-close portion N of the left and right center frames 16A and 16B, the horizontal part 652 of the mating member 650 on the non-collision side can slide inside the openings 660a of the open cross section members 660 when the cabin section 20 moves relative to the chassis frame 10 during a front collision or a rear collision. As a result, a restraining force that prevents the non-collision side of the cabin section 20 from lifting up is obtained and damage to the rigidity and strength of the left and right center frames 16A and 16B can be prevented.

Since the insides of the open cross section members 660 are filled with the readily deformable material 641 along portions of the open cross section members 660 that are located toward the center cross frame 15C from the portions where the horizontal parts 652 of the mating members 650 are inserted, a resistance force is generated when the horizontal part 652 moves and deforms the readily deformable material 641 inside the open cross section members 660. Therefore, the collision energy can be absorbed efficiently.

Thus, in the seventh embodiment, the open cross section members 660 are mounted to the left and right center frames 16A and 16B to serve as guides for the horizontal parts 652 of the mating members 650. Alternatively, as seen in FIG. 21 the seventh embodiment of the present invention can be configured and arranged such that the left and right center frames 16A and 16B include openings 660a' to serve as guides for the horizontal parts 652 instead of having the open cross section members 660.

More specifically, in the alternate embodiment of the seventh embodiment shown in FIG. 21, at least the drawn-close portion N of the left and right center frames 16A and 16B is provided with the openings 660a' to form that are open on the mutually facing sides of the left and right center frames 16A and 16B. Both ends of the horizontal part 652' of the mating member 650 are be movably inserted into the openings 660a' of the open cross sections formed in the left and right center frames 16A and 16B. The left and right center frames 16A and 16B are preferably filled with the readily deformable material 641 along the portions of the open cross sections of the left and right center frames 16A and 16B that are located toward the center cross frame 15C from the portions where the horizontal parts 652 are inserted.

Eighth Embodiment

Figure 22:
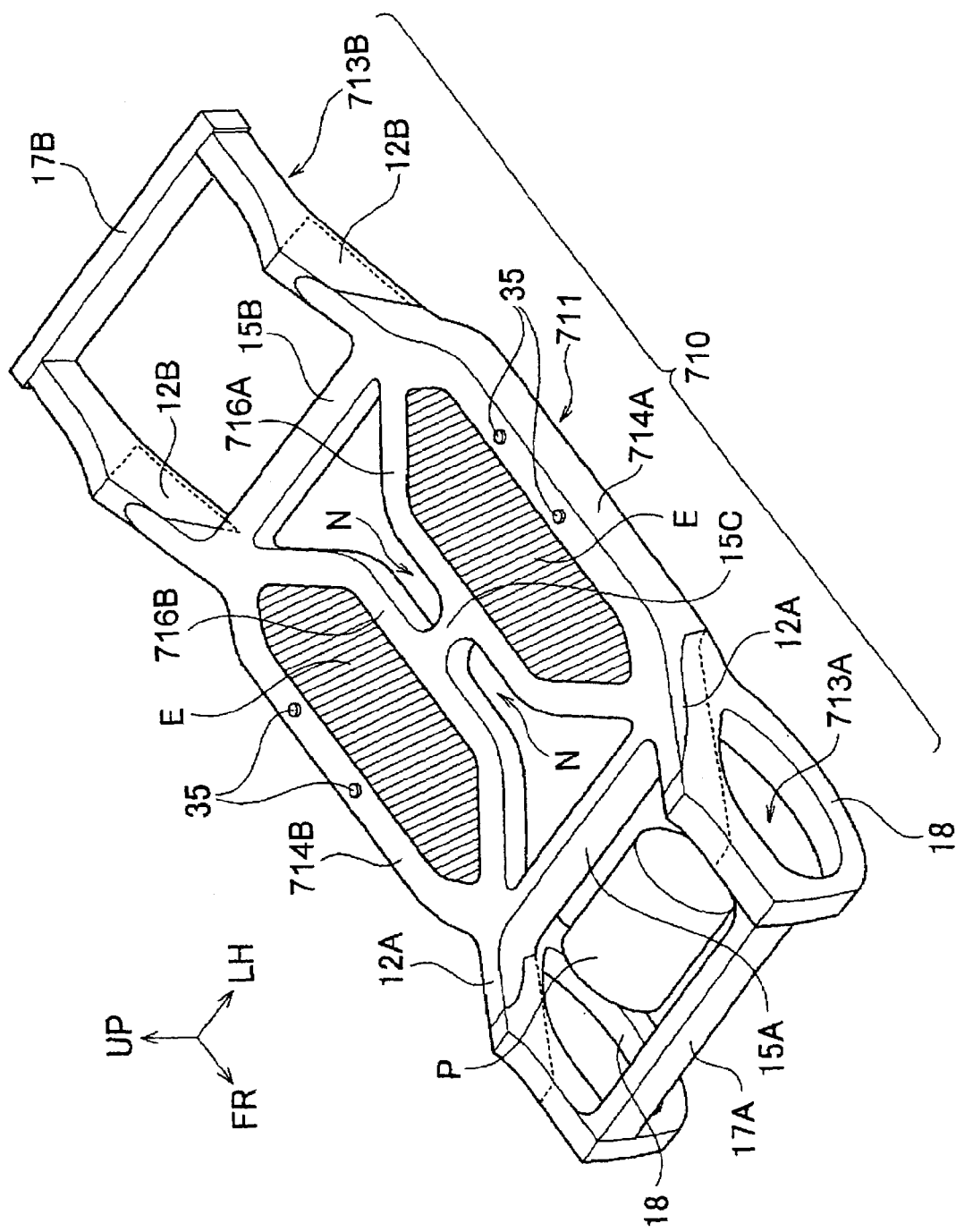
FIG. 22 is an enlarged perspective view of a chassis frame of a vehicle body structure in accordance with an eighth embodiment of the present invention.

Referring now to FIG. 22, a vehicle body structure in accordance with an eighth embodiment will now be explained. In view of the similarity between the first, second and eighth embodiments, the parts of the eighth embodiment that are identical to the parts of the first or second embodiment will be given the same reference numerals as the parts of the first embodiment. Moreover, the descriptions of the parts of the eighth embodiment that are identical to the parts of the first or second embodiment may be omitted for the sake of brevity.

FIG. 22 is an enlarged perspective view of a chassis frame 710 of a vehicle body structure in accordance with the eighth embodiment of the present invention. Basically, the vehicle body structure of the eighth embodiment is identical to the vehicle body structure of the first embodiment, except that the chassis frame 710 has been substituted for the chassis frame 10 of the first embodiment.

As shown in FIG. 22, the vehicle body structure of the eighth embodiment has a drive unit P mounted to the front end section 713A. Also it will be apparent to those skilled in the art from this disclosure that the drive unit P can be mounted to the rear end section 713B. Moreover, a fuel tank, battery, or other energy storage system E is mounted in a region surrounded by a pair of center frames 716A and 716B and a pair of side frames 714A and 714B of the chassis frame 710.

Accordingly, with the eight embodiment, the energy storage system E (which is a heavy item that is mounted to the vehicle) can be mounted in such a manner as to be concentrated in the longitudinally center portion of the chassis frame 710. Therefore, the center of gravity of the vehicle can be lowered and the stability of the behavior of the vehicle when the vehicle is traveling can be improved.

Ninth Embodiment

Figure 23:
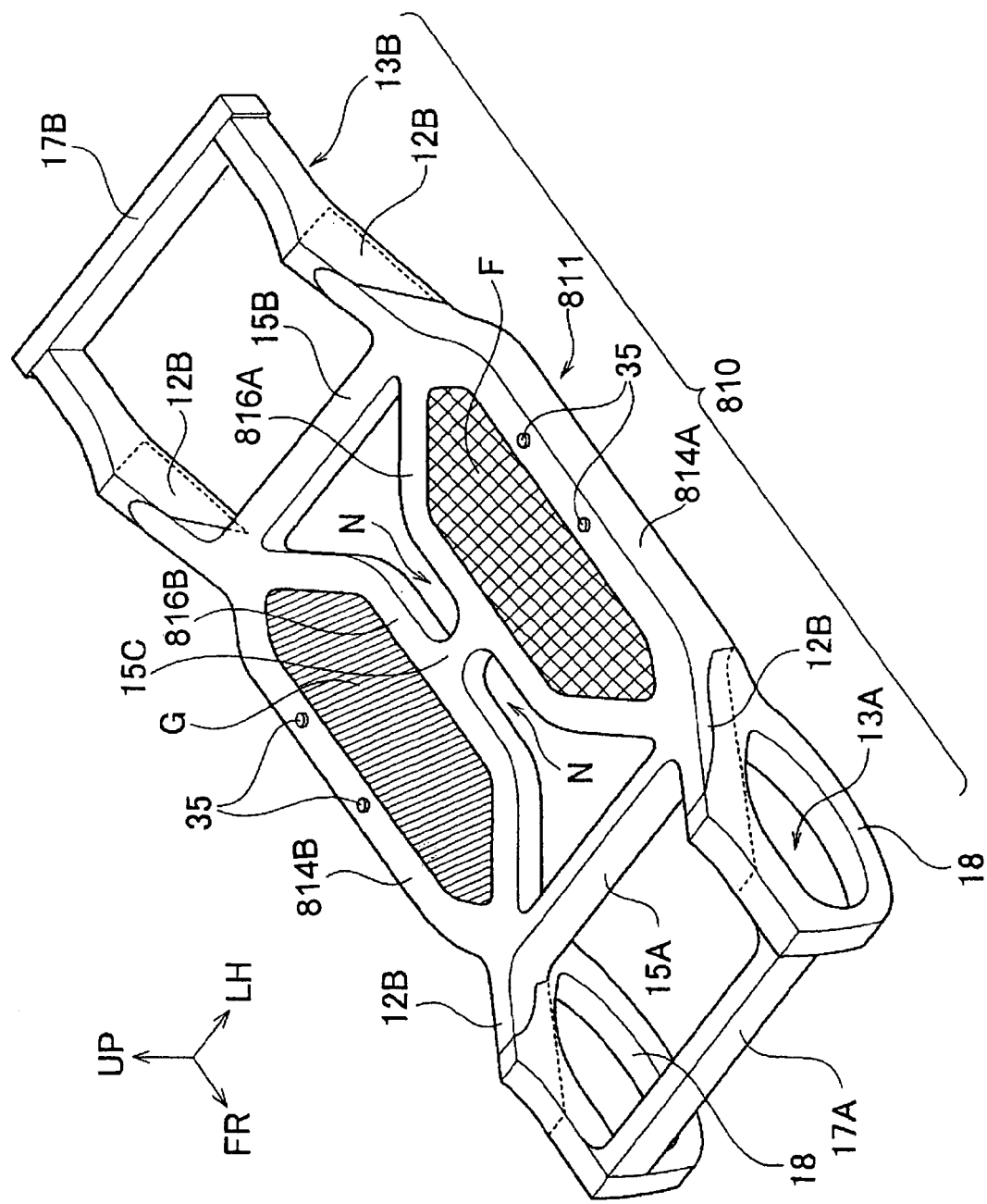
FIG. 23 is an enlarged perspective view of a chassis frame of a vehicle body structure in accordance with a ninth embodiment of the present invention.

Referring now to FIG. 23, a vehicle body structure in accordance with a ninth embodiment will now be explained. In view of the similarity between the first, second and ninth embodiments, the parts of the ninth embodiment that are identical to the parts of the first or second embodiment will be given the same reference numerals as the parts of the first embodiment. Moreover, the descriptions of the parts of the ninth embodiment that are identical to the parts of the first or second embodiment may be omitted for the sake of brevity.

FIG. 23 is an enlarged perspective view of a chassis frame 810 of the vehicle body structure in accordance with the ninth embodiment of the present invention that is mounted to the cabin section 20 of FIG. 12. Basically, the vehicle body structure of the ninth embodiment is identical to the vehicle body structure of the first embodiment, except that the chassis frame 810 has been substituted for the chassis frame 10 of the first embodiment.

As shown in FIG. 22, the vehicle body structure of the ninth embodiment constitutes an arrangement of an electric car including an energy storage section G and an energy generating system F disposed in regions surrounded by a pair of left and right center frames 816A and 816B and a pair of left and right side frames 814A and 814B of the chassis frame 810. More specifically, the energy storage section G and the energy generating section F are formed as a battery, hydrogen gas storage system, or other fuel cell system-based energy storage means or the energy generating means. Moreover, the vehicle body structure of the ninth embodiment is preferably configured and arranged to include an operating system provided in the cabin section 20 that electronically controls braking, drive, steering, and other operational systems related to driving the vehicle. Also, a drive motor is preferably mounted in a wheel axle portion of the vehicle body structure.

Accordingly, with the ninth embodiment, since mechanical operation portions related to driving the vehicle are not required to be disposed in the cabin section 20, the cabin section 20 can be easily replaced with respect to the chassis frame 810. Thus, different types of the cabin section 20 having different functions and external appearances can be mounted to the same chassis frame 810. Accordingly, the range of selection can be widened. Also, the heavy items can be mounted in such a manner as to be concentrated in the longitudinally center portion of the chassis frame 810. Of course, it will be apparent to those skilled in the art from this disclosure that the arrangements of mounting the electric car including an energy storage section G and the energy generating system F in the chassis frame 810 and the operation systems in the cabin section 20 can be adapted to the vehicle body structures of the first embodiments to the seventh embodiments explained above.

Tenth Embodiment

Figure 24:
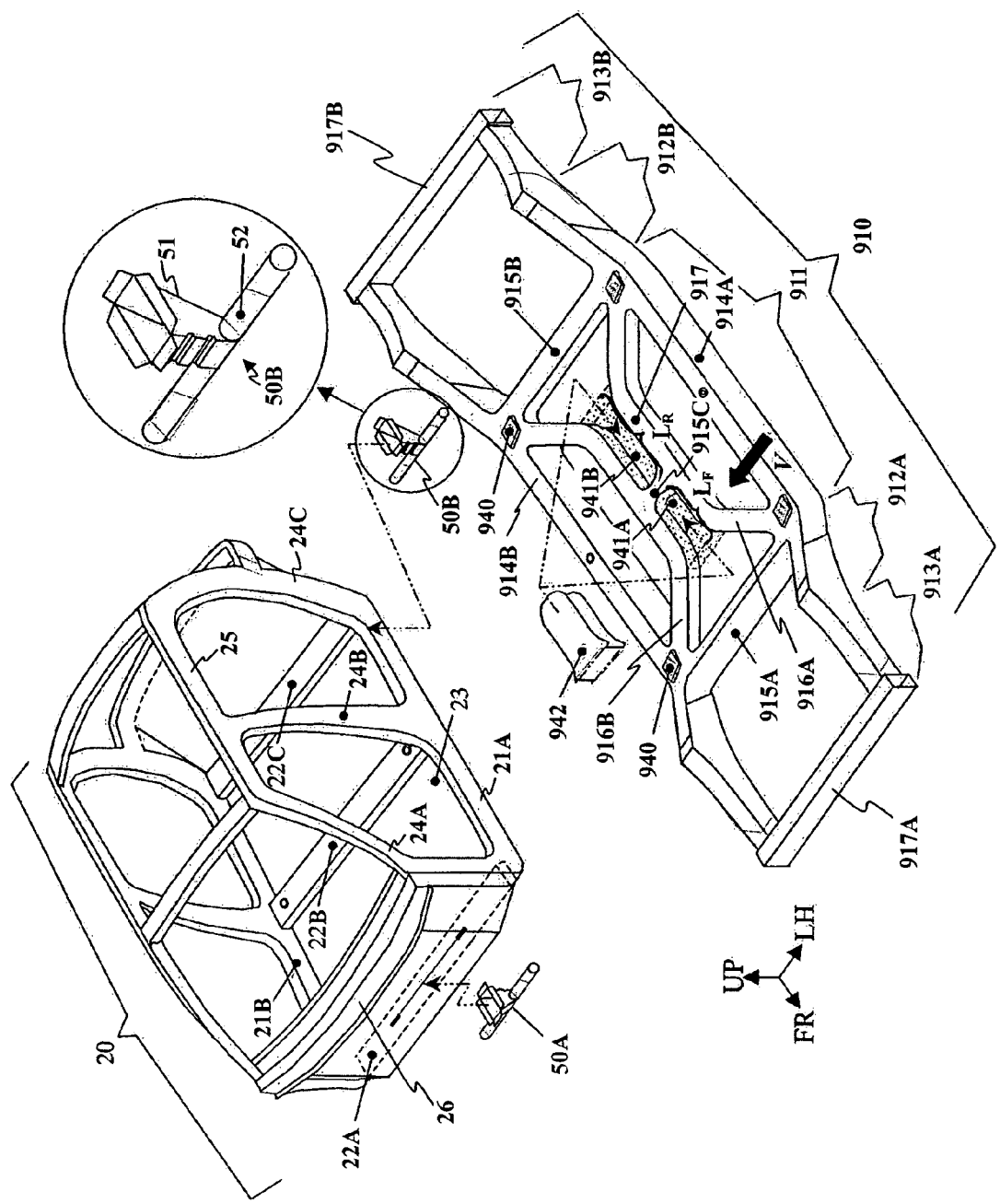
FIG. 24 is a simplified exploded front perspective view of an overall vehicle body structure in accordance with a tenth embodiment of the present invention.

Referring now to FIG. 24, a vehicle body structure in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

FIG. 24 is an exploded perspective view of the vehicle body structure in accordance with the tenth embodiment of the present invention. Basically, the vehicle body structure of the tenth embodiment is identical to the vehicle body structure of the first embodiment, except a modified chassis frame 910 is used in place of the chassis frame 10 of the first embodiment. Basically, the chassis frame 910 differs from the chassis frame 10 in that the chassis frame 910 has been modified to provide a different range of relative movement between the chassis frame 910 and the cabin section 20 for a front collision from a rear collision. Thus, the vehicle body structure in accordance with the tenth embodiment of the present invention utilizes the same displacement mechanism of the first embodiment, as discussed above, except for the modification to the longitudinal ranges of movement due to either a front collision or a rear collision.

Similar to the first embodiment discussed above, one of the components of the displacement mechanism is a cabin longitudinal movement mechanism configured and arranged to allow the cabin section 20 to move upward with respect to the chassis frame 910 on a collision side and restrain upward movement of the cabin section 20 on the non-collision side when the vehicle undergoes a front collision or a rear collision. Thus, the cabin longitudinal movement mechanism preferably comprises components that are configured and arranged to allow a relative displacement between the chassis frame 910 and the cabin section 20 during a front or rear collision, as discussed above, in the first embodiment.

As explained above, the displacement mechanism includes the shear bolts 33 that fasten or couple the cabin section 20 and the chassis frame 910 together. The shear bolts 33 are configured and arranged to break due to shear when subjected to a load input equal to or greater than a prescribed load. Consequently, when a collision load is imparted to the chassis frame 910 during a front, a rear or a side collision, the shear bolts 33 are configured and arranged to break due to shear caused by the inertial force acting on the cabin section 20. Therefore, the transmission of the impact force from the chassis frame 910 to the cabin section 20 can be alleviated.

In this embodiment, the chassis frame 910 has a longitudinal frame rigidity that is equal to or larger than a longitudinal cabin rigidity of the cabin section 20. The chassis frame 910 also has a lateral or transverse frame rigidity that is equal to or smaller than a lateral cabin rigidity of the cabin section 20.

In this tenth embodiment, as seen in FIG. 24, the chassis frame 10 comprises a plurality of framework members including a floor section 911, a front kick-up section 912A, a rear kick-up section 912B, a front end section 913A, and a rear end section 913B. The floor section 911 is configured and arranged to be positioned under the cabin section 20. The front and rear kick-up sections 912A and 912B are configured to form slanted surfaces 12 on the front and rear of the floor section 911. The front end section 913A is provided in front of the front kick-up section 912A. The rear end section 913B is provided in rear of the rear kick-up section 912B. The balance of rigidity and strength of the framework members of the chassis frame 910 are preferably the same as the first embodiment as seen in FIG. 2.

Moreover, the floor section 911 of the chassis frame 910 is provided with a pair of left and right side frames 914A and 914B, a pair of front and rear cross frames 915A and 915B, a center cross frame 915C, and a pair of left and right center frames 916A and 916B. The chassis frame 910 also includes a front cross member 917A connected to the front ends of the front end section 913A and a rear cross member 917B connected to the rear ends of the rear end section 913B. The floor section 911 of the chassis frame 910 also has a front readily deformable member 941A and a rear readily deformable member 9411B. As explained below, the front readily deformable member 941A is configured and arranged to be compressed or deformed during a rear collision by the longitudinal movement of the cabin section 20 relative to the chassis frame 910. In particular, the front mating member 50A deforms the front deformable member 941A as the cabin section 20 moves rearwardly relative to the chassis frame 910 during a rear collision.

Similarly, the rear readily deformable member 941B is configured and arranged to be compressed or deformed during a front collision by the longitudinal movement of the cabin section 20 relative to the chassis frame 910. In particular, the rear mating member 50B deforms the rear deformable member 941B as the cabin section 20 moves forwardly relative to the chassis frame 910 during a front collision. In this embodiment, the front deformable member 941A has an effective longitudinal length $L_F$ and the rear deformable member 941B has an effective longitudinal length $L_R$ that is larger than the longitudinal length $L_F$ of the front deformable member 941A. In other words, the front and rear deformable members 941A and 941B are configured and arranged to accommodate a larger longitudinal movement of the cabin section 20 relative to the chassis frame 910 during a front collision than a rear collision.

The two readily deformable members 941A and 941B are arranged in front of and behind the center cross frame 915C, respectively. The readily deformable members 941A and 9411B preferably have smaller deformation strength than the floor section 911 of the chassis frame 910, the lower framework of the cabin section 20 and the mating members 50A and 50B. In the tenth embodiment, the readily deformable members 941A and 941B are preferably made of foamed metal with outside surfaces of the readily deformable members 941A and 941B preferably covered with deformable covers 942. Thus, the readily deformable members 941A and 941B act as energy absorbing members that are disposed in a space between the chassis frame 910 and the cabin section 20 with the readily deformable members 941A and 941B being configured and arranged to absorb a portion of the impact load due to relative movement between the chassis frame 910 and the cabin section 20 during at least one of a front collision, a rear collision or a side collision.

The front kick-up section 912A and the front end section 913A are configured and arranged with an effective longitudinal length such that the cabin section 20 moves both forwardly and upwardly relative to the chassis frame 910 during a front collision in the same manner as the first embodiment. However, the chassis frame 910 is configured and arranged to allow for greater forward movement of the cabin section 20 relative to the chassis frame 910 during a front collision than during a rear collision. Similarly, the rear kick-up section 912B and the rear end section 913B are configured and arranged with an effective longitudinal length such that the cabin section 20 moves both rearwardly and upwardly relative to the chassis frame 910 during a rear collision in the same manner as the first embodiment. However, the chassis frame 910 is configured and arranged to allow for smaller rearward movement of the cabin section 20 relative to the chassis frame 910 during a rear collision than during a front collision.

The center cross frame 915C that couples the left and right center frames 916A and 916B together is located in front of the longitudinal midpoints of the left and right center frames 916A and 916B. This location of the center cross frame 915C limits the relative longitudinal displacement between the chassis frame 910 and the cabin section 20 such that the cabin section 20 moves a greater amount in the longitudinal direction relative to the chassis frame 910 during a front collision than during a rear collision. In other words, the front mating member 50A is located closer to the center cross frame 915C than the rear mating member 50B such that the range of movement of the cabin section 20 relative to the chassis frame 910 is smaller for a rear collision than during a front collision.

Preferably, in the normal pre-collision state, the front mating member 50A contacts or is spaced slightly from the front deformable member 941A, while the rear mating member 50B contacts or is spaced slightly from the rear deformable member 941B. When a front collision occurs that breaks the shear bolts 33, the rear readily deformable member 941B compresses or deforms by the longitudinal movement of the cabin section 20 relative to the chassis frame 910. In particular, the rear mating member 50B compresses or deforms the rear deformable member 941B as the cabin section 20 moves forwardly relative to the chassis frame 910 during a front collision. During this forward longitudinal movement of the cabin section 20 relative to the chassis frame 910, the cabin section 20 initially moves primarily in only a horizontal direction, until the cabin section 20 contacts the front kick-up section 912A. When the cabin section 20 contacts the front kick-up section 912A, the cabin section 20 begins to move simultaneously in an upward direction and a horizontal direction. These movements are controlled by the displacement mechanism of this embodiment in the same manner as the first embodiment as seen in FIGS. 7 and 8.

When a rear collision occurs that breaks the shear bolts 33, the front readily deformable member 941A compresses or deforms by the longitudinal movement of the cabin section 20 relative to the chassis frame 910. In particular, the front mating member 50A compresses or deforms the front deformable member 941A as the cabin section 20 moves rearwardly relative to the chassis frame 910 during a rear collision. During this rearward longitudinal movement of the cabin section 20 relative to the chassis frame 910, the cabin section 20 initially moves primarily in only a horizontal direction, until the cabin section 20 contacts the rear kick-up section 912B. When the cabin section 20 contacts the rear kick-up section 912B, the cabin section 20 begins to move simultaneously in an upward direction and a horizontal direction.

In other words the displacement mechanism of this embodiment is configured and arranged such that an upward movement and a horizontal movement of the cabin section 20 occur relative to the chassis frame 910 in response to the impact load when the vehicle undergoes a front collision or a rear collision. More specifically, the displacement mechanism of this embodiment is configured and arranged such that the upward and horizontal movements of the cabin section 20 relative to the chassis frame 910 occur at least partially simultaneously. In the illustrated embodiment, the displacement mechanism is further configured and arranged such that a portion of the horizontal movement of the cabin section 20 relative to the chassis frame 910 occurs prior to the upward movement of the cabin section 20 relative to the chassis frame 910. As can be readily seen from FIGS. 6 and 7, which is applicable to this embodiment, the displacement mechanism of this embodiment is further configured and arranged such that the horizontal movement of the cabin section 20 relative to the chassis frame 910 is larger than the upward movement of the cabin section 20 relative to the chassis frame 910.

Moreover, the displacement mechanism of this embodiment is further configured and arranged with a first or forward horizontal displacement amount of the cabin section 20 relative to the chassis frame 910 during a front collision, and a second or rearward horizontal displacement amount of the cabin section 20 relative to the chassis frame 910 during a rear collision. In this embodiment, the first or forward horizontal displacement amount being greater than the second or rearward horizontal displacement.

As in the first embodiment, the tenth embodiment also includes four attitude stabilizing mechanisms 940 that are identical to the attitude stabilizing mechanisms 40 discussed above with reference to the first embodiment.

Of course, it will be apparent to those skilled in the art from this disclosure that this tenth embodiment can be modified to selectively incorporate the features of the prior embodiments as needed and or desired. For example, the two readily deformable members 43, shown in FIG. 12 can be provide on the slanted surfaces of the front and rear kick-up sections 912A and 912B of the chassis frame 910 as needed and or desired. The readily deformable members 43 are preferably fixedly coupled to the slanted surfaces of the kick-up section 12A of the chassis frame 110. Furthermore, the arrangements shown in FIGS. 13–23 can be selectively incorporated into this tenth embodiment as needed and or desired. For example, the arrangements of the energy storage section G and the energy generating system F of the ninth embodiment can be used in the chassis frame 910.

As used herein to describe the preceding embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. Also, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No.2003-133719. The entire disclosure of Japanese Patent Application No. 2003-133719 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A vehicle body structure comprising:
   a chassis frame;
   a cabin section configured and arranged as a separate and independent structure from the chassis frame and to form a passenger residing space; and
   a displacement mechanism connecting the cabin section to the chassis frame such that the cabin section can move separately relative to the chassis frame in response to an impact load,
   the displacement mechanism including a cabin section longitudinal movement mechanism that is configured and arranged to guide the cabin section to move with respect to the chassis frame in a lengthwise direction of the vehicle toward a collision side with the cabin section being slanted with respect to the chassis frame upwardly from a non-collision side to the collision side when the vehicle undergoes a front collision or a rear collision.

2. The vehicle body structure as recited in claim 1, wherein
   the cabin section longitudinal movement mechanism is further configured and arranged to guide both of the collision side and the non-collision side of the cabin section to move with respect to the chassis frame toward the collision side and to allow the cabin section to move upward with respect to the chassis frame on the collision side and restrain upward movement of the cabin section on the non-collision side when the vehicle undergoes the front collision or the rear collision.

3. The vehicle body structure as recited in claim 1, wherein
the displacement mechanism includes a cabin section transverse movement mechanism that is configured and arranged to allow the cabin section to move toward a non-collision side with respect to the chassis frame when the vehicle undergoes a side collision in which the impact load is concentrated on the cabin section.

4. A vehicle body structure comprising:
a chassis frame;
a cabin section configured and arranged as a separate and independent structure from the chassis frame and to form a passenger residing space; and
a displacement mechanism connecting the cabin section to the chassis frame such that the cabin section can move separately relative to the chassis frame in response to an impact load,
the chassis frame including
a floor section positioned under the cabin section,
a pair of front and rear kick-up sections forming slanted surfaces in front and rear sides of the floor section,
a front end section located in front of the front kick-up section, and
a rear end section located in rear of the rear kick-up section,
the chassis frame being configured and arranged to have rigidity and strength with respect to input of the impact load from the front of the vehicle and the rear of the vehicle so that the rigidity and strength of the front end section and the rear end section are approximately equal to each other, the rigidity and strength of the front and rear kick-up sections and the floor section are approximately equal to one another, and the rigidity and strength of the front and rear kick-up sections and the floor section are larger than the rigidity and strength of the front end section and the rear end section.

5. The vehicle body structure as recited in claim 4, wherein
the floor section of the chassis frame includes
left and right side frames extending in a lengthwise direction of the vehicle between the front and rear kick-up sections to form left and right edges of the floor section, respectively,
front and rear cross frames extending between the left and right side frames to form front and rear border portions between the floor section and the front and rear kick-up sections, respectively,
left and right center frames connected to portions where the front and rear cross frames are coupled to the left side frame and connected to portions where the front and rear cross frames are coupled to the right side frame, respectively, the left and right center frames extending in the lengthwise direction such that longitudinal center portions of the left and right center frames are positioned closer to each other in a transverse vehicle body direction than longitudinal edge portions of the left and right center frames are positioned in the transverse vehicle body direction with respect to each other to form a drawn-close portion, and
a center cross frame extending in the transverse vehicle body direction to connect the longitudinal center portions of the left and right center frames at substantially longitudinal midpoints of the longitudinal center portions.

6. The vehicle body structure as recited in claim 5, wherein
the cabin section includes a flat underside formed by a lower framework including
left and right side-edge frame members extending in the lengthwise direction of the vehicle body to form left and right edges of the lower framework;
front, middle, and rear transverse frame members configured to transversely connect the left and right side-edge frame members together at a front end section, a middle section, and a rear end section of the left and right side-edge frame members, respectively; and
a floor panel horizontally coupled to the front, middle, and rear transverse frame members.

7. The vehicle body structure as recited in claim 1, wherein
the displacement mechanism includes at least one shear bolt coupling the cabin section and the chassis frame together, the at least one shear bolt being configured and arranged to break due to shear failure when a load equal to or greater than a prescribed load is input to one of the cabin section and the chassis frame.

8. A vehicle body structure comprising:
a chassis frame;
a cabin section configured and arranged as a separate and independent structure from the chassis frame and to form a passenger residing space; and
a displacement mechanism connecting the cabin section to the chassis frame such that the cabin section can move separately relative to the chassis frame in response to an impact load,
the displacement mechanism including at least one shear bolt coupling the cabin section and the chassis frame together, the at least one shear bolt being configured and arranged to break due to shear failure when a load equal to or greater than a prescribed load is input to one of the cabin section and the chassis frame,
the at least one shear bolt passes through upper and lower tubular members in a substantially close-fitting manner, the upper and lower tubular members being fixed to the cabin section and the chassis frame, respectively, such that the upper and lower tubular members are positioned adjacent to each other in a substantially coaxial manner.

9. The vehicle body structure as recited in claim 7, wherein
the at least one shear bolt includes left and right shear bolts,
the left shear bolt is coupled to the cabin section at one of a portion where a left side-edge frame member is coupled to a middle transverse frame member and a portion on the middle transverse frame member,
the right shear bolt is coupled to the cabin section at one of a portion where a right side-edge frame member is coupled to the middle transverse frame member and a portion on the middle transverse frame member, and
the cabin section includes left and right center pillars extending from the portions where the left and right side-edge frame members are coupled to the middle transverse frame member.

10. The vehicle body structure as recited in claim 6, wherein
the displacement mechanism includes at least one mating member configured and arranged to extend vertically downwardly from the lower framework of the cabin section and to sliceable mate with a bottom surface of the drawn-close portion of the left and right center frames of the floor section of the chassis frame when the cabin section moves longitudinally such that the at least one mating member moves toward a longitudinal center of the chassis frame.

11. The vehicle body structure as recited in claim 10, further comprising
at least one readily deformable member disposed between the left and right center frames at a position closer to the longitudinal center of the chassis frame than the at least one mating member.

12. The vehicle body structure as recited in claim 1, further comprising
an attitude stabilizing mechanism disposed between the chassis frame and the cabin section.

13. The vehicle body structure as recited in claim 12, wherein
the attitude stabilizing mechanism is made of a substance having a lower elastic modulus than materials from which the chassis frame and the cabin section are made.

14. The vehicle body structure as recited in claim 5, wherein
the longitudinal center portions of the left and right center frames extend substantially parallel to each other in a longitudinal direction of the vehicle to form left and right trapezoids so that the longitudinal center portions of the left and right center frames form upper bases of the left and right trapezoids, respectively, and the left and right side frames form lower bases of the left and right trapezoids, respectively.

15. The vehicle body structure as recited in claim 5, wherein
the longitudinal center portions of the left and right center frames are shaped like arcs or curves having apexes of the arcs or the curves at portions where the longitudinal center portions of the left and right center frames are coupled together by the center cross frame.

16. The vehicle body structure as recited in claim 5, wherein
the longitudinal center portions of the left and right center frames and the left and right side frames are shaped like left and right triangles having apexes at a portion where the longitudinal center portions of the left and right center frames are coupled together by the center cross frame.

17. The vehicle body structure as recited in claim 5, further comprising
a readily deformable member is disposed in a space between at least one of the slanted surfaces of the front and rear kick-up sections of the chassis frame and the cabin section.

18. The vehicle body structure as recited in claim 5, wherein
at least one of the front and rear end sections of the chassis frame has a vertically-two-leveled frame structure.

19. The vehicle body structure as recited in claim 10, wherein
the at least one mating member is a substantially T-shaped member including
a holding arm configured and arranged to be mounted to the lower framework of the cabin section, and
a horizontal part coupled to a bottom end of the holding arm to extend in the transverse vehicle body direction, the horizontal part being configured and arranged to be positioned below the left and right center frames of the chassis frame and having a transverse width that is longer in the transverse vehicle body direction than a transverse width of a space formed in the drawn-close portion between the longitudinal center portions of the left and right center frames.

20. The vehicle frame structure as recited in claim 19, wherein
the holding arm of the at least one mating member has a substantially vertical wall on a side that faces the center cross frame of the chassis frame and a slanted part on a side opposite to the vertical wall, the slanted part being configured to slant upward and away from the vertical wall.

21. The vehicle frame structure as recited in claim 20, wherein
the vertical wall of the holding arm of the at least one mating member includes a structurally weakened part to promote controlled deformation of the holding arm.

22. The vehicle frame structure as recited in claim 20, wherein
the horizontal part of the at least one mating member has a transverse width that is larger than a transverse width of a space between the longitudinal center portions of the left and right center frames, and
a strength of the at least one mating member including a mounting portion of the holding arm is higher than a strength of the left and right center frames.

23. The vehicle body structure as recited in claim 10, wherein
at least one of the front and rear cross frames is provided with a recessed part for avoiding interference with the at least one mating member.

24. The vehicle structure as recited in claim 19, wherein
the at least one mating member includes a swing restricting mechanism that is configured to allow the holding arm that is coupled to the lower framework of the cabin section to swing in a direction toward the center cross frame of the chassis frame and to prevent the holding arm from swinging in a direction away from the center cross frame of the chassis frame.

25. The vehicle body structure as recited in claim 19, wherein
the holding arm and the horizontal part of the at least one mating member are made by press forming panel materials and coupling them together, and
the horizontal part is provided with a tubular member oriented in a lengthwise direction of the horizontal part.

26. The vehicle body structure as recited in claim 19, wherein
the holding arm and the horizontal part of the at least one mating member are made by assembling parts that were made using a hydraulic forming method, and
the horizontal part is reinforced with a rib.

27. The vehicle body structure as recited in claim 10, wherein
the left and right side frames of the chassis frame have cross sectional heights that are larger than cross sectional heights of the left and right center frames of the chassis frame,
the left and right side frames of the chassis frame have top surface height positions that are approximately equal to top surface height positions of the left and right center frames of the chassis frame, and
the at least one mating member has a bottom end that is positioned higher than bottom surfaces of the left and right side frames of the chassis frame.

28. The vehicle body structure as recited in claim 19, further comprising a pair of left and right open cross section members mounted on mutually facing surfaces of the longitudinal center portions of the left and right center frames such that openings of the left and right open cross section members face each other, and the at least one mating member being configured such that transverse ends of the horizontal part are movably inserted into the openings of the left and right open cross section members.

29. The vehicle body structure as recited in claim 28, wherein the left and right open cross section members are filled with a readily deformable material along portions of the left and right open cross section members that are located closer to the center cross frame than portions where the horizontal part of the mating member is inserted.

30. The vehicle body structure as recited in claim 19, wherein at least the longitudinal center portions of the left and right center frames have open cross sectional structures with open portions on mutually facing sides of the left and right center frames, transverse ends of the horizontal part of the at least one mating member are movably inserted into the open portions of the left and right center frames, and the open portions of the left and right center frames are filled with a readily deformable material along portions of the open cross sectional structures that are located closer to the center cross frame than portions where the horizontal part of the at least one mating member is inserted.

31. The vehicle body structure as recited in claim 1, wherein at least one of the chassis frame and the cabin section is formed with a hollow member having a rectangular or polygonal cross sectional shape.

32. The vehicle body structure as recited in claim 1, wherein at least one of the chassis frame and the cabin section is formed with a press formed member made by press forming steel, aluminum, or other sheet materials and coupling the press forming steel, aluminum, or other sheet materials together.

33. The vehicle body structure as recited in claim 1, wherein at least a portion of one of the chassis frame and the cabin section is formed by a closed cross section member that is formed using a hydraulic forming method.

34. The vehicle body structure as recited in claim 1, wherein at least a portion of one of the chassis frame and the cabin section is formed by a member made by coupling steel, aluminum, or other panel materials of different thicknesses together to form a tailored blank, working the tailored blank into a bag-like form, and molding the bag-like form using a hydraulic forming method.

35. The vehicle body structure as recited in claim 1, wherein at least one of the chassis frame and the cabin section is formed by a spaceframe structure made primarily of extruded members formed by extruding an aluminum alloy or other lightweight metal alloy, the space frame structure being formed by combining the extruded members with cast parts and panel parts.

36. The vehicle body structure as recited in claim 1, wherein at least one of the chassis frame and the cabin section are made of fiber reinforced resin and formed as a single integral unit.

37. The vehicle body structure as recited in claim 4, wherein the front end section and the rear end section are formed as separate members from the chassis frame, and the front end section and the rear end section are connected in a detachable manner to the front kick-up section and rear kick-up section of the chassis frame.

38. The vehicle body structure as recited in claim 5, further comprising a drive unit mounted on one of the front end section and the rear end section of the chassis frame; and an energy storage system including a fuel tank or a battery mounted in at least one of a region surrounded by the left center frame and the left side frame of the chassis frame and a region surrounded by the right center frame and the right side frame of the chassis frame.

39. The vehicle body structure as recited in claim 1, further comprising at least one energy absorbing member disposed in a space between the chassis frame and the cabin section with the at least one energy absorbing member being configured and arranged to absorb a portion of the impact load due to relative movement between the chassis frame and the cabin section during at least one of a front collision, a rear collision or a side collision.

40. The vehicle body structure as recited in claim 39, wherein the at least one energy absorbing member includes at least one readily deformable member disposed in the space between the chassis frame and the cabin section.

41. The vehicle body structure as recited in claim 1, wherein the displacement mechanism is configured and arranged such that an upward movement and a horizontal movement of the cabin section occur relative to the chassis frame in response to the impact load when the vehicle undergoes a front collision or a rear collision.

42. The vehicle body structure as recited in claim 41, wherein the displacement mechanism is further configured and arranged such that the upward and horizontal movements of the cabin section relative to the chassis frame occur at least partially simultaneously.

43. The vehicle body structure as recited in claim 42, wherein the displacement mechanism is further configured and arranged such that the horizontal movement of the cabin section relative to the chassis frame is larger than the upward movement of the cabin section relative to the chassis frame.

44. The vehicle body structure as recited in claim 42, wherein the displacement mechanism is further configured and arranged such that a portion of the horizontal movement of the cabin section relative to the chassis frame occurs prior to the upward movement of the cabin section relative to the chassis frame.

45. The vehicle body structure as recited in claim 41, further comprising at least one energy absorbing member disposed in a space between the chassis frame and the cabin section with the at least one energy absorbing member being configured and arranged to absorb a portion of the impact load due to relative movement between the chassis frame and the cabin section during a front collision or a rear collision.

46. The vehicle body structure as recited in claim 1, wherein
the displacement mechanism is further configured and arranged with a first horizontal displacement amount of the cabin section relative to the chassis frame during a front collision and a second horizontal displacement amount of the cabin section relative to the chassis frame during a rear collision, the first horizontal displacement amount being greater than the second horizontal displacement.

47. The vehicle body structure as recited in claim 1, wherein
the chassis frame has a longitudinal frame rigidity that is equal to or larger than a longitudinal cabin rigidity of the cabin section.

48. The vehicle body structure as recited in claim 47, wherein
the chassis frame has a lateral frame rigidity that is equal to or smaller than a lateral cabin rigidity of the cabin section.

49. The vehicle body structure as recited in claim 1, wherein
the chassis frame has a lateral frame rigidity that is equal to or smaller than a lateral cabin rigidity of the cabin section.

50. A vehicle body structure comprising:

a chassis frame;

a cabin section configured and arranged as a separate and independent structure from the chassis frame and to form a passenger residing space; and displacement means for connecting the cabin section to the chassis frame such that the cabin section can move separately relative to the chassis frame in response to an impact load, the displacement means further including a function for guiding the cabin section to move with respect to the chassis frame in a lengthwise direction of the vehicle toward a collision side with the cabin section being slanted with respect to the chassis frame upwardly from a non-collision side to the collision side during a front collision or a rear collision.

* * * * *